(12) United States Patent
Nakamura et al.

(10) Patent No.: US 6,263,173 B1
(45) Date of Patent: Jul. 17, 2001

(54) IMAGE FORMATION APPARATUS HAVING SELECTION OF DIFFERENT IMAGE TYPES FOR IMAGE FORMATION

(75) Inventors: Shinichi Nakamura, Kawasaki; Naoyuki Ohki, Matsudo; Mitsuo Nimura; Norifumi Miyake, both of Kashiwa; Kiyoshi Okamoto, Toride; Takayuki Fujii, Tokyo; Tsuyoshi Moriyama, Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/418,590

(22) Filed: Oct. 15, 1999

(30) Foreign Application Priority Data

Oct. 20, 1998 (JP) .................................................. 10-298155

(51) Int. Cl.$^7$ .................................................. G03G 15/00
(52) U.S. Cl. .................................. 399/82; 399/17; 399/81; 399/367
(58) Field of Search ................................. 399/17, 81, 82, 399/85, 361, 367, 382

(56) References Cited

U.S. PATENT DOCUMENTS

| | | | |
|---|---|---|---|
| 4,341,462 | * 7/1982 | Ogura | 399/382 X |
| 4,893,153 | * 1/1990 | Sales et al. | 399/382 |
| 5,457,524 | * 10/1995 | Metcalf et al. | 399/382 |
| 5,754,924 | * 5/1998 | Yamada | 399/81 |
| 5,828,932 | * 10/1998 | Ohata et al. | 399/367 X |
| 5,852,501 | * 12/1998 | Machara et al. | 399/367 X |

* cited by examiner

Primary Examiner—Sandra Brase
(74) Attorney, Agent, or Firm—Fitzpatrick, Cella, Harper & Scinto

(57) ABSTRACT

A CPU circuit unit of a copying machine judges based on image data read by a reading unit whether or not the image data represents a color image, and controls according to the judged result whether or not image forming of the image data is to be performed, whereby an operation to be performed by a user when plural originals mixedly including color originals and black/white originals are copied can be simplified.

53 Claims, 14 Drawing Sheets

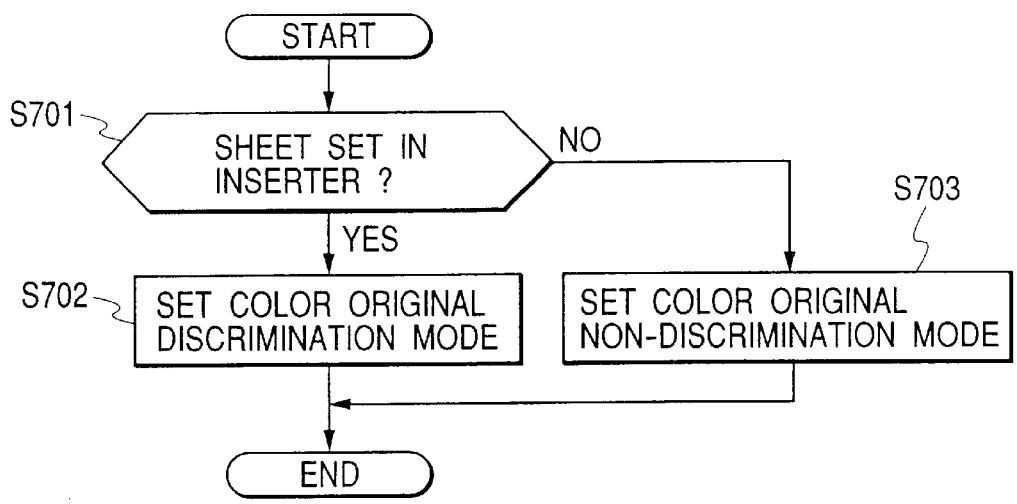
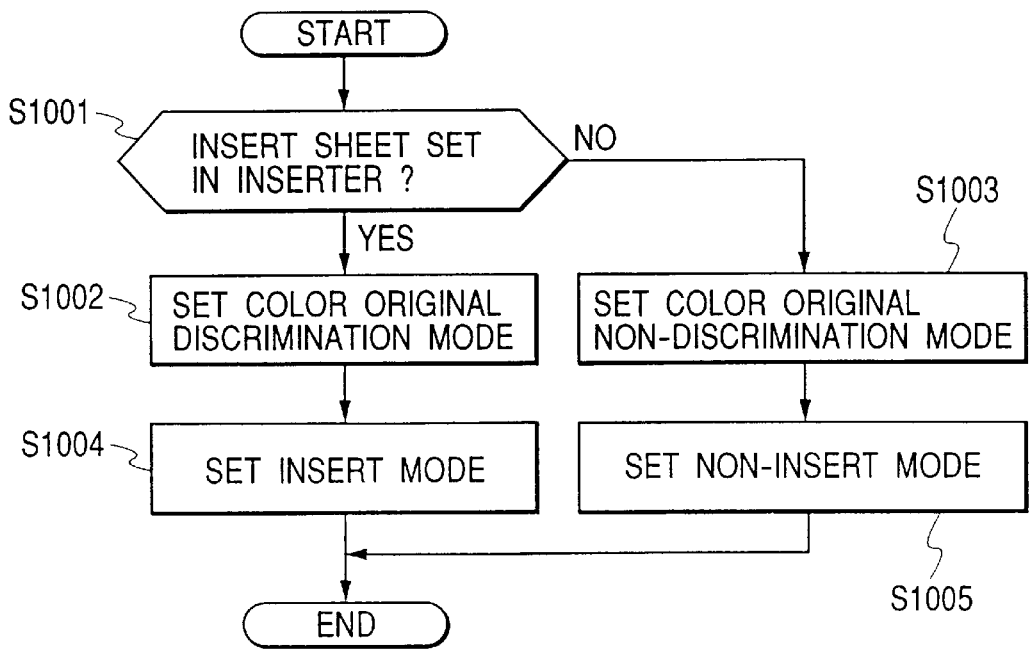

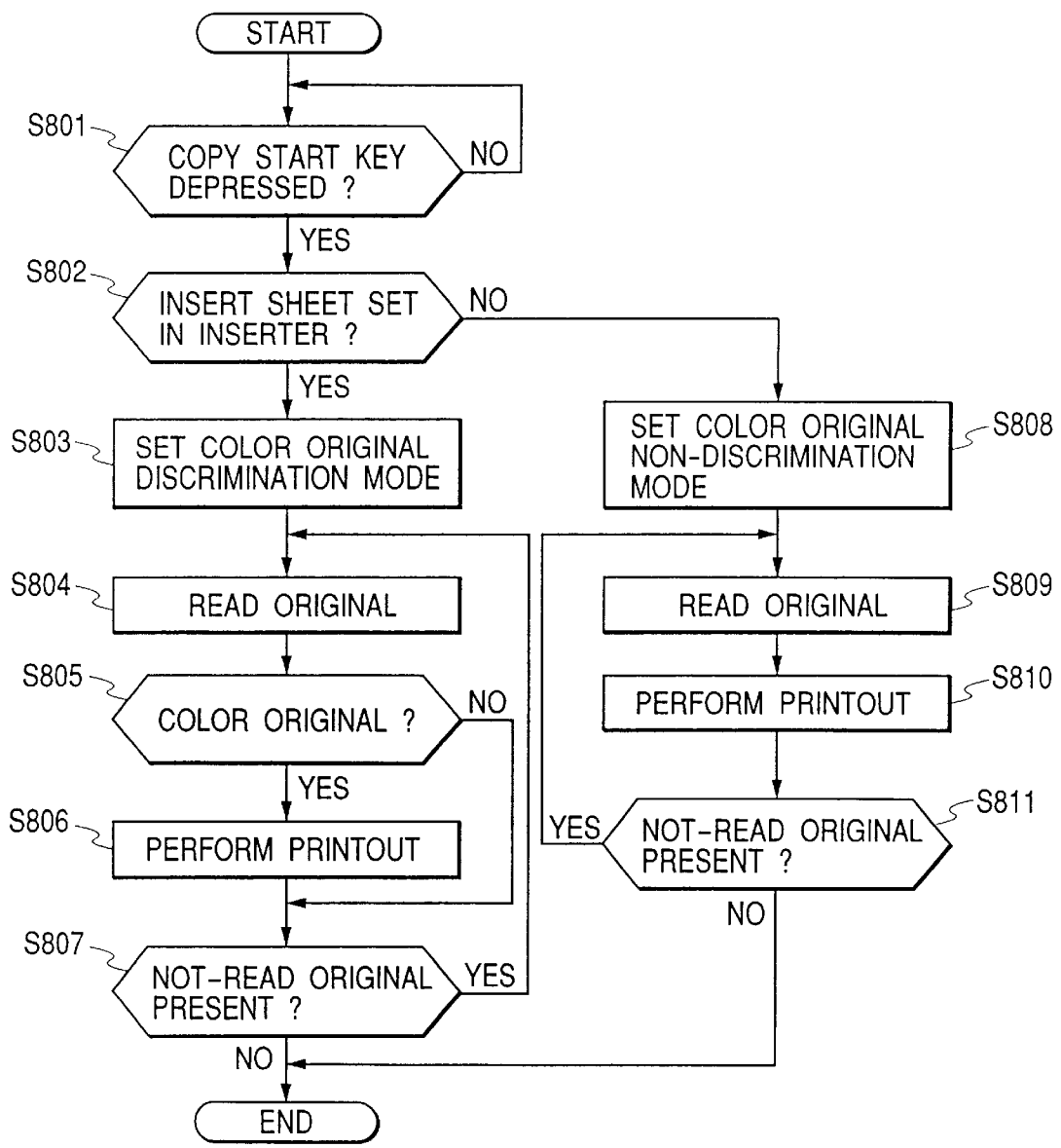

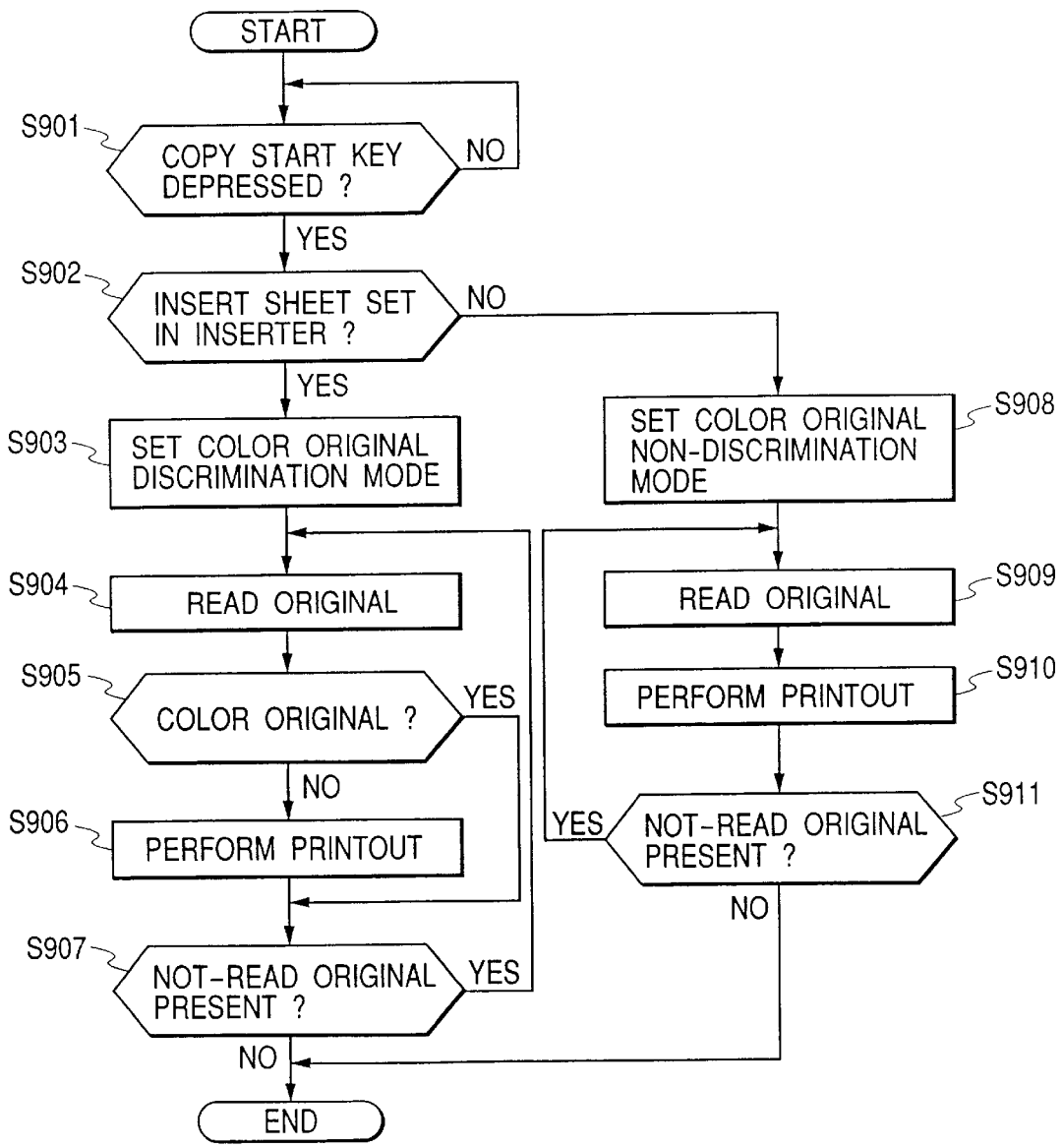

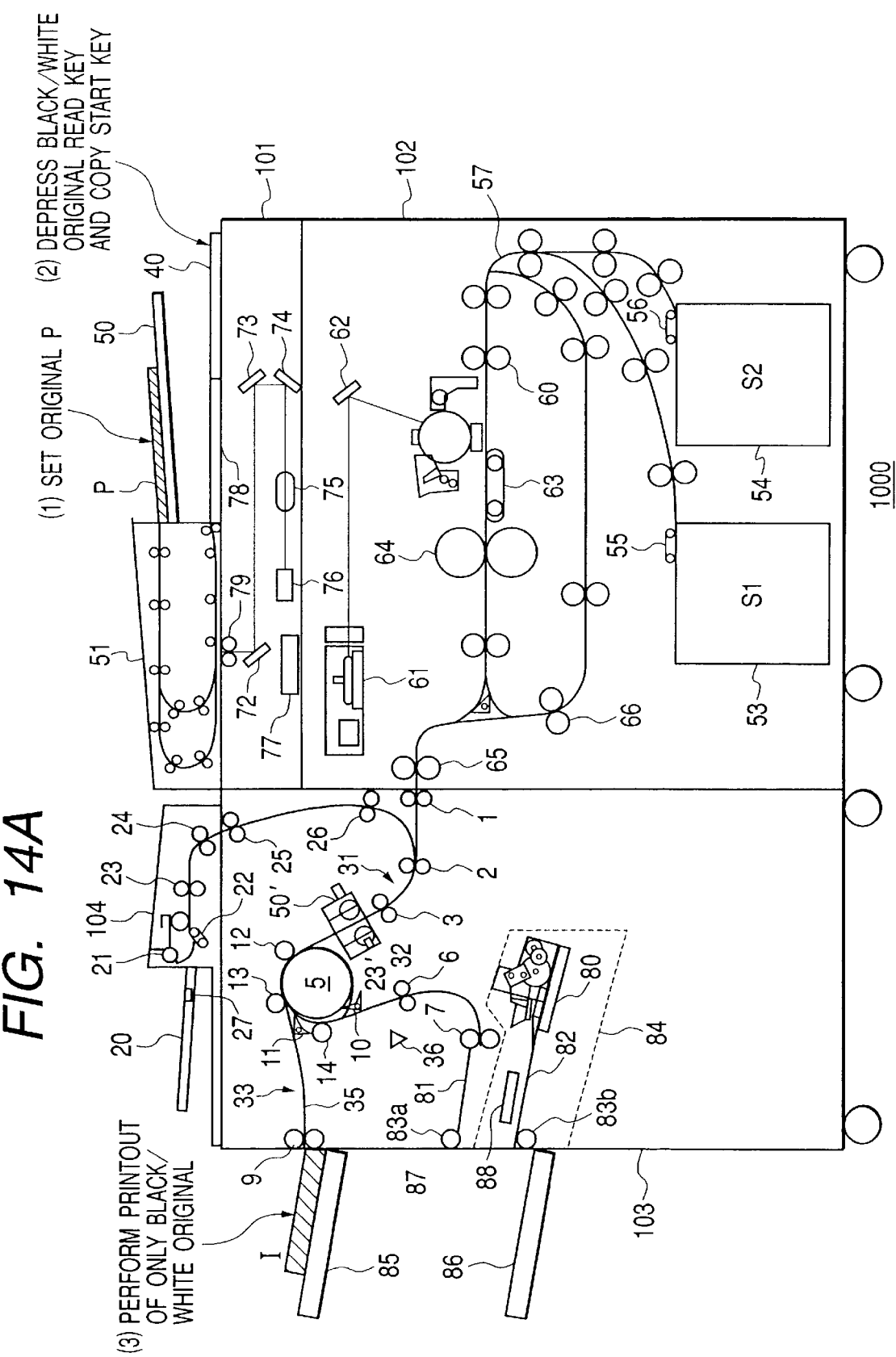

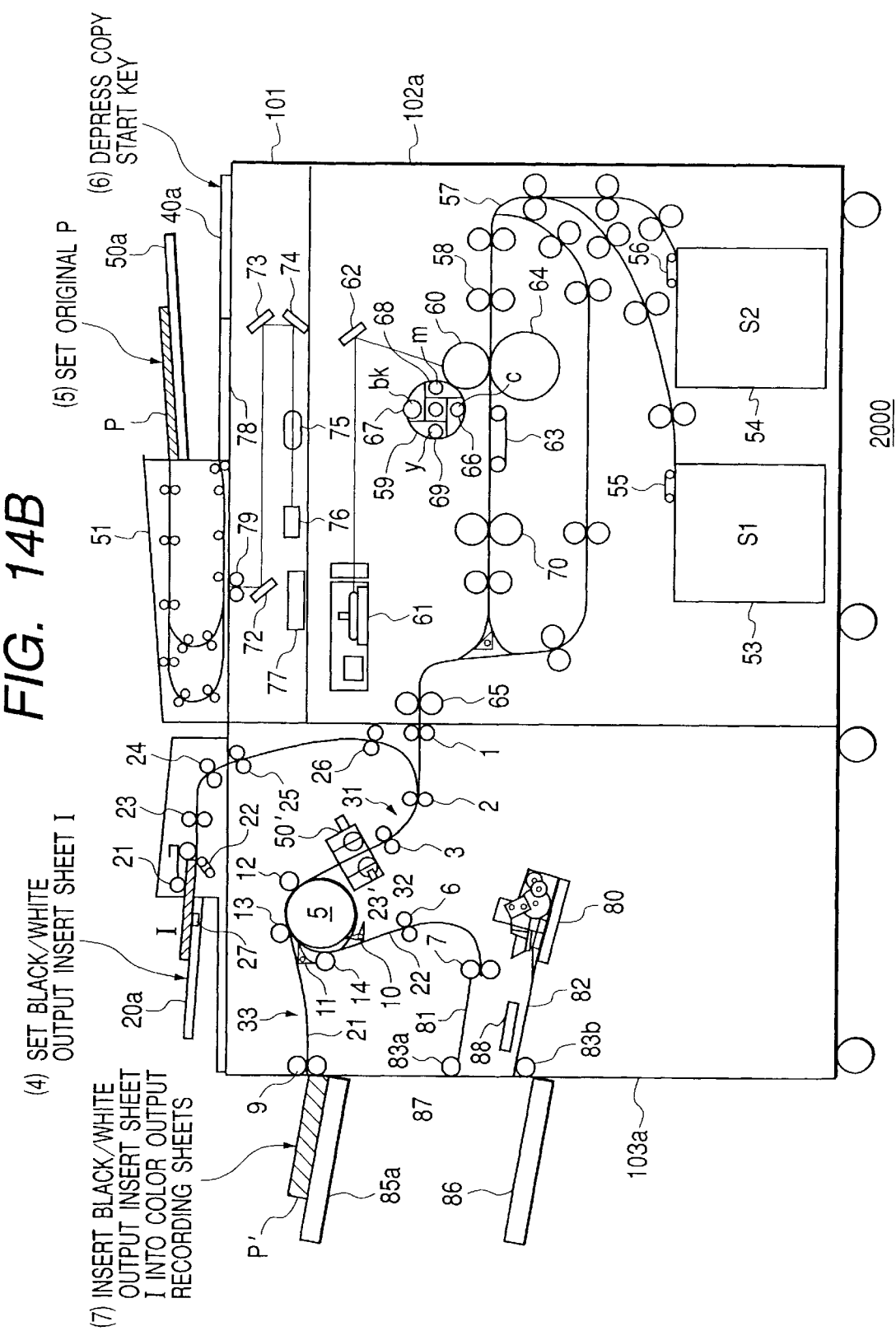

IMAGE FORMATION APPARATUS HAVING SELECTION OF DIFFERENT IMAGE TYPES FOR IMAGE FORMATION

BACKGROUND OF THE INVENTION

1. Field of the Invention

The present invention relates to an image formation apparatus which includes a read means for performing an image data reading process.

2. Related Background Art

Conventionally, in a case where plural originals mixedly including color originals and black/white originals are copied, a user operates a color copying machine to print out all of the plural originals and thus obtains copies (or duplicates) mixedly including color pages and black/white pages.

On the other hand, the color copying machine needs longer time and higher cost for an image formation process as compared with those of a black/white copying machine. Thus, in the originals mixedly including the color originals and the black/white originals, it is desired for the black/white copying machine to print out only the black/white originals.

Therefore, in the case where the plural originals mixedly including the color originals and the black/white originals are printed out, it is thought to print out the black/white originals by the black/white copying machine and to print out the color originals by the color copying machine.

However, when the black/white originals are printed out by the black/white copying machine and the color originals are printed out by the color copying machine, the user has to previously divide the plural originals into the black/white originals and the color originals.

Then, if printout with the black/white copying machine and printout with the color copying machine are completed, the user has to return the plural originals divided into the black/white originals and the color originals to the former state. Especially, if the originals have no page number, or if there are numerous originals, it is difficult for the user to return them to the former state.

Further, in order to put recording sheets of paper (referred as recording sheets hereinafter) printed out from the black/white copying machine and recording sheets printed out from the color recording machine into one, the user has to appropriately insert the recording sheets output from one copying machine into the recording sheets output from the other copying machine, whereby it takes time and trouble.

As above, in the case where the plural originals mixedly including the color originals and the black/white originals are copied, the operation to be performed by the user is very complex, and such the operation gives the user annoyingness.

SUMMARY OF THE INVENTION

An object of the present invention is to provide an image formation apparatus which can solve such a problem as described above.

Another object of the present invention is to provide an image formation apparatus which can simplify operation to be performed by a user when plural originals mixedly including color originals and black/white originals are copied.

Other objects and features of the present invention will become apparent from the following detailed description and the attached drawings.

BRIEF DESCRIPTION OF THE DRAWINGS

FIG. 7 is a flow chart of a process concerning mode setting for the copying machine;

FIG. 8 is a flow chart showing a process to be performed when, from plural originals, only color originals are printed out;

FIG. 9 is a flow chart showing a process to be performed when, from the plural originals, only black/white originals are printed out;

FIG. 10 is a flow chart showing a process of an insert mode;

FIGS. 14A and 14B are views for explaining a method to copy the plural originals mixedly including the color originals and the black/white originals.

DETAILED DESCRIPTION OF PREFERRED EMBODIMENT

Figure 1:
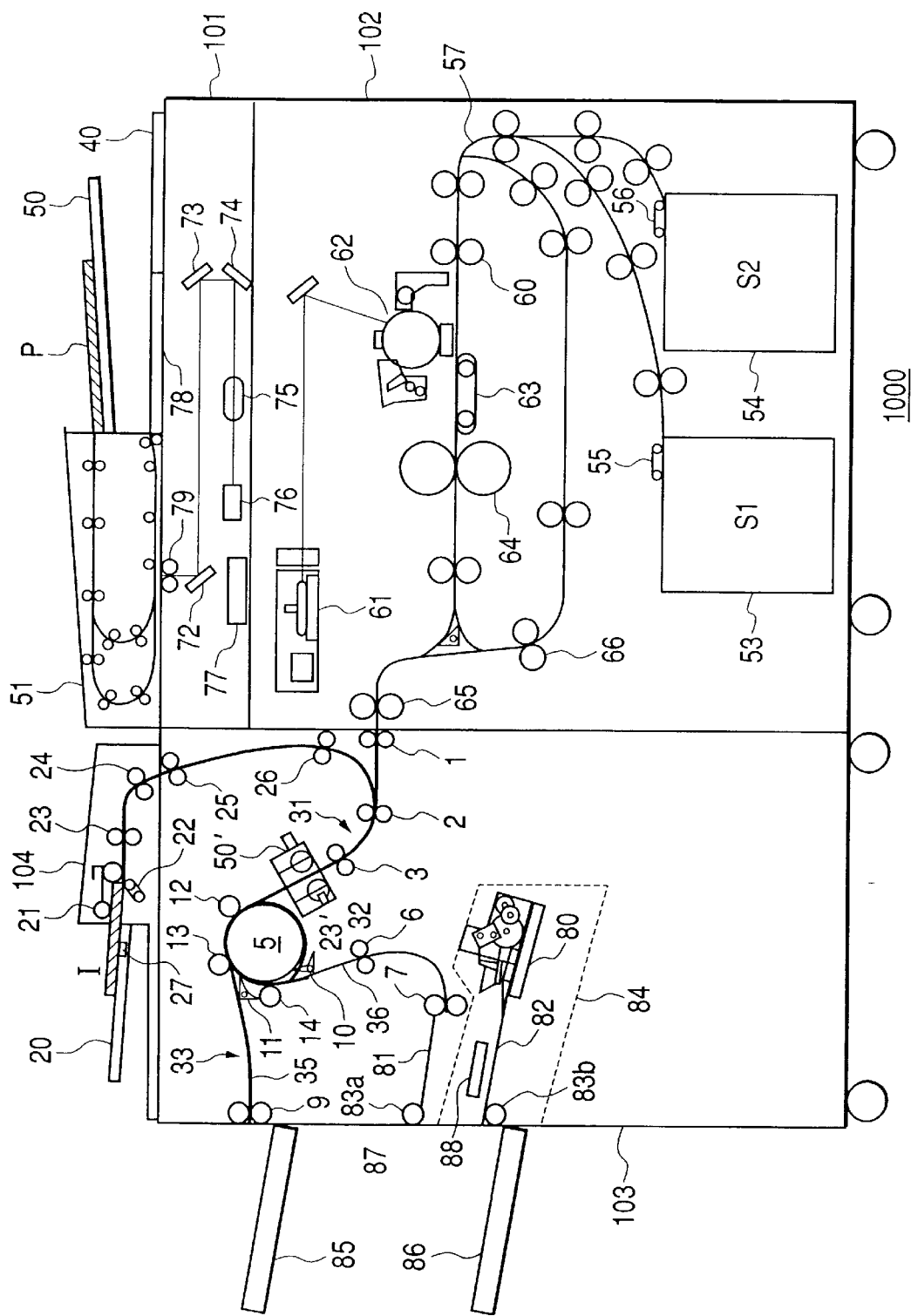
FIG. 1 is a sectional view showing a copying machine.

FIG. 1 is a sectional view showing an internal structure of a copying machine 1000 according to the present invention. The copying machine 1000 is composed of a read unit 101, an image formation unit 102, a sheet process unit (referred as finisher hereinafter) 103 and an operation unit 40. The operation unit 40 is used to perform operation setting, confirmation of the setting contents and the like for the image formation unit 102 and the finisher 103.

The read unit 101 includes an automatic document feed unit (ADF) 51, a lamp 79, a three-line sensor (CCD) 76 for image reading, reflection mirrors 72 to 74, and a lens 75. The ADF 51 feeds an original P set on an original stack tray 50 up to a original reading position, performs an original reading process at the reading position, and then carries the original P read at the reading position up to a sheet discharge position. The lamp 79 irradiates the original P fed to the original reading position on an original mounting board (glass) 78, the reflection mirrors 72 to 74 guide reflection light from the original P into the CCD 76, and the lens 75 images the reflection light on the CCD 76.

The CCD 76 includes color line sensors, amplifiers and analog-to-digital (A/D) converters. Each line sensor independently captures each of R (red), G (green) and B (blue) analog signals, each amplifier amplifies each analog color signal, and each A/D converter converts the analog color signal into an eight-bit digital signal. The output signals from the CCD 76 are input to an image signal control unit 77.

The image formation unit 102 includes recording sheet storage units 53 and 54, and recording sheet feed units 55 and 56. In the storage units 53 and 54, plural different-size recording sheets S (i.e., S1 and S2) are stacked respectively. The recording sheet fed by the unit 55 or 56 is carried to a sheet carrying path 60 through a sheet carrying path 57.

Further, the image formation unit 102 includes a laser scanner 61 and an image recording unit 62. The laser scanner 61 performs laser beam scanning based on image information of the original read by the read unit 101, to form a latent image on a photosensitive body of the image recording unit 62. Then the unit 62 performs an image formation process to form a toner image on the photosensitive body and transfer the formed toner image onto the recording sheet S.

The recording sheet S on which the image has been formed by the image recording unit 62 is carried to the finisher 103 through a carrying belt 63, a fixing roller 64 and a carrying roller 65. The fixing roller 64 softens and melts the toner image, whereby the toner image is fixed to the sheet S.

Next, the finisher 103 will be explained. The finisher 103 includes an inlet roller 1 and an inserter 104. The inlet roller 1 carries the recording sheet S fed from the image formation unit 102, and the inserter 104 performs an insert process.

The insert process will be explained. In the insert process, a sheet I (referred as insert sheet I hereinafter) set on a tray 20 of the inserter 104 shown in FIG. 1 is fed to either of a sample tray 85 or a stack tray 86 without passing the image formation unit 102. The insert process is performed to insert the insert sheet I between the successive sheets fed from the image formation unit 102 into the finisher 103.

The insert sheet I is set faceup on the tray 20 of the inserter 104 by a user. At the tray 20, the sheets are sequentially fed from the uppermost one by a sheet feed roller 21. Therefore, the sheet from the inserter 104 is carried to the sample tray 85 or the stack tray 86 as it is, through a carrying rollers 23, 24 and 25, whereby the sheet is discharged facedown.

The plural originals P are set faceup on the original stack tray 50, and the read unit 101 sequentially reads them from the uppermost one.

In the image formation unit 102, if the recording sheet on which the image formation process has ended is carried facedown to the finisher 103, the recording sheet is once carried to the side of a carrying roller 66 and then switchbacked to the finisher 103. On the other hand, if the recording sheet is carried faceup to the finisher 103, the sheet is not carried to the roller 66 to prevent switchback but is carried to the finisher 103 as it is.

That is, in case of performing the insert process by using the inserter 104, the recording sheet is switchbacked at the side of the image formation unit 102 and fed facedown to the finisher 103. Then, at the side of the finisher 103, the fed recording sheet is discharged facedown to the sample tray 85 or the stack tray 86 as it is. Thus, the face of the insert sheet I carried from the inserter 104 can be matched with that of the recording sheet S carried from the image formation unit 102.

The tray 20 is to set the insert sheet I, and the sheet feed roller 21 is to feed the insert sheet I. A separation roller 22 is to separate the insert sheet I fed from the roller 21, and an insert sheet setting detection sensor 27 is to detect whether or not the insert sheet I is set on the tray 20. The insert sheet I fed from the separation roller 22 is then carried to a carrying roller 2 through the rollers 23, 24, 25 and 26.

The finisher 103 includes the carrying rollers 2 and 3 and a sheet detection sensor 31. The rollers 2 and 3 carry the recording sheet S or the insert sheet I, and the sensor 31 is the inlet-side sensor to detect passing of the sheet S or I carried from the roller 2.

Further, the finisher 103 includes a punch unit 50', a relatively large-diameter roller (referred as buffer roller hereinafter) 5 disposed in a carrying path, pressing rollers 12 to 14 disposed around the buffer roller 5. The punch unit 50' performs a punch process at the position near the trailing edge of the recording sheet S or the insert sheet I carried from the carrying roller 3, and the rollers 12 to 14 carry the sheet by pressing it to the roll face of the buffer roller 5.

A first switchover flapper 11 is to selectively switch a non-sort path 35 and a sort path 36, and a second switchover flapper 10 is to switch a buffer path 23' and the sort path 36. The buffer path 23' temporarily stores the recording sheet S or the insert sheet I.

A sheet detection sensor 33 is to detect the recording sheet S or the insert sheet I on the non-sort path 35, and a sheet detection sensor 32 is to detect the recording sheet S or the insertion sheet I on the buffer path 23'.

Further, the finisher 103 includes a carrying roller 6 disposed on the sort path 36, and a process tray unit 84. The process tray unit 84 includes an intermediate tray (referred as process tray hereinafter) 82, an arranging board 88 and a discharge roller 83b. The process tray 82 is to temporarily accumulate the recording sheets S or the insertion sheets I, arrange or jog the accumulated sheets and perform a stapling process to the arranged sheets by using a stapling unit 80. The arranging board 88 is to arrange or jog the sheets S or the sheets I stacked on the process tray 82. The discharge roller 83b acts as the fixing-side discharge roller which is one of the components constituting a sheaf discharge roller disposed at the discharge end of the process tray 82.

A discharge roller 7 which is disposed on the sort path 36 acts as a first discharge roller to discharge the recording sheet S or the insert sheet I onto the stack tray 86 through the process tray 82.

A discharge roller 9 which is disposed on the non-sort path 35 acts as a second discharge roller to discharge the recording sheet S or the insert sheet I onto the sample tray 85.

An upper discharge roller 83a is supported by a rocking guide 81. Thus, when the guide 81 reaches a close position, the recording sheets S or the insert sheets I on the process tray 82 forcedly contacted with the roller 83a are discharged as a sheaf onto the stack tray (i.e., second stack tray) 86.

A sheaf stack guide 87 bumps against the trailing edge (with respect to a sheaf discharge direction) of the sheaf of sheets stacked on the stack tray 86 or the sample tray 85, thereby supporting the sheaf. Also, the guide 87 acts as the case of the finisher 103.

If the user sets the original P on the original stack tray 50 and handles the operation unit 40 of the copying machine 1000, the image formation process starts.

In the copying machine 1000, the read unit 101 reads the original P and the image formation unit 102 starts feeding the recording sheet S from the recording sheet storage unit 53 or 54, in response to an instruction from the user. Then the recording sheet S is carried to the image recording unit 62 through the sheet carrying path 60. Further, data which was set in the operation unit 40 and is necessary for a sheet sorting operation and an operation start signal are transferred to the finisher 103 to start the operation of the finisher 103.

Next, the image formation process is performed. Namely, on the basis of the image information of the read original, the toner image is transferred onto the recording sheet S carried to the image recording unit 62, the transferred toner image is fixed by the fixing unit. Then, in the finisher 103, the insert sheets I is fed, the fed sheets are sorted, and the sorted sheets are stapled.

Figure 2:
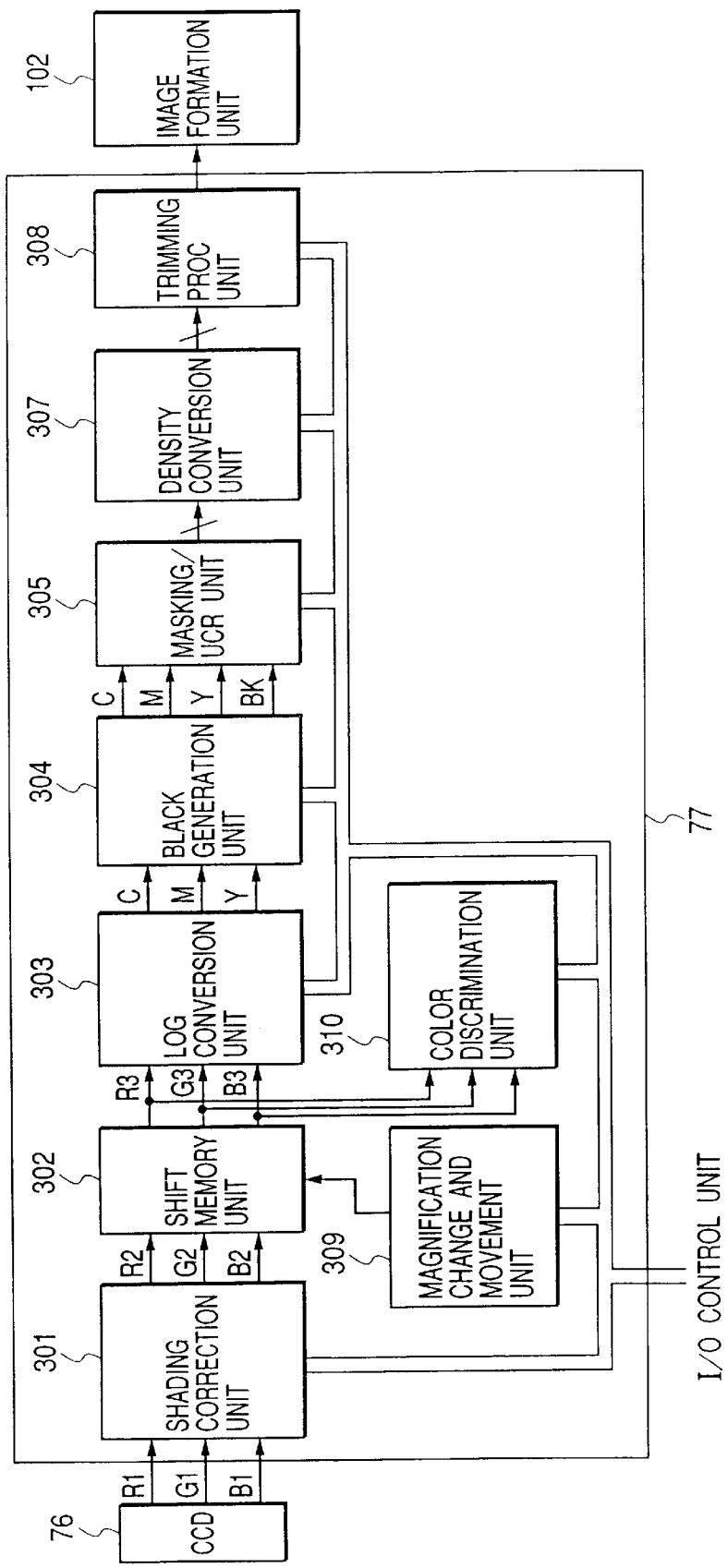
FIG. 2 is a block diagram showing an image signal control unit.

FIG. 2 is a block diagram showing a detailed structure of an image signal control unit 77. The output signal from the CCD 76 is subjected to shading correction for each color by a shading correction unit 301, misregister of color and pixel in the signal is corrected by a shift memory unit 302, and then the obtained signal is input to a color discrimination unit 310 and a LOG (logarithmic) conversion unit 303. The LOG conversion unit performs logarithmic correction for light density conversion.

Y (yellow), M (magenta) and C (cyan) density signals output from the LOG conversion unit 303 are input to a black generation unit 304. In the unit 304, a BK (black) signal is generated based on the input density signals.

In a masking/UCR (under color removal) unit 305, color sensor filter characteristics and toner density characteristics are corrected for the Y, M, C and BK signals output from the black generation unit 304, and then one color to be developed is selected from among the four color signals. Subsequently, density conversion according to a print development characteristic and a user's liking is performed by a density conversion unit 307, an editing process for an interval which the user desires is performed by a trimming process unit 308, and finally the processed signal is output to the image formation unit 102.

The signals output from the shift memory unit 302 are input to the color discrimination unit 310. In the unit 310, it is discriminated whether the original P includes achromatic color or chromatic color, and the chromatic color of which level is equal to or higher than a certain level. If the original P includes the achromatic color, R, G and B signal ratios are equal to others. Therefore, if the difference in the R, G and B signals is small, it is discriminated in this case that the original includes achromatic color. Concretely, the difference between the R and G signals is calculated and the difference between the G and B signals is calculated. Then, as such the difference is small, it is discriminated that the original includes achromatic color.

Figure 3:
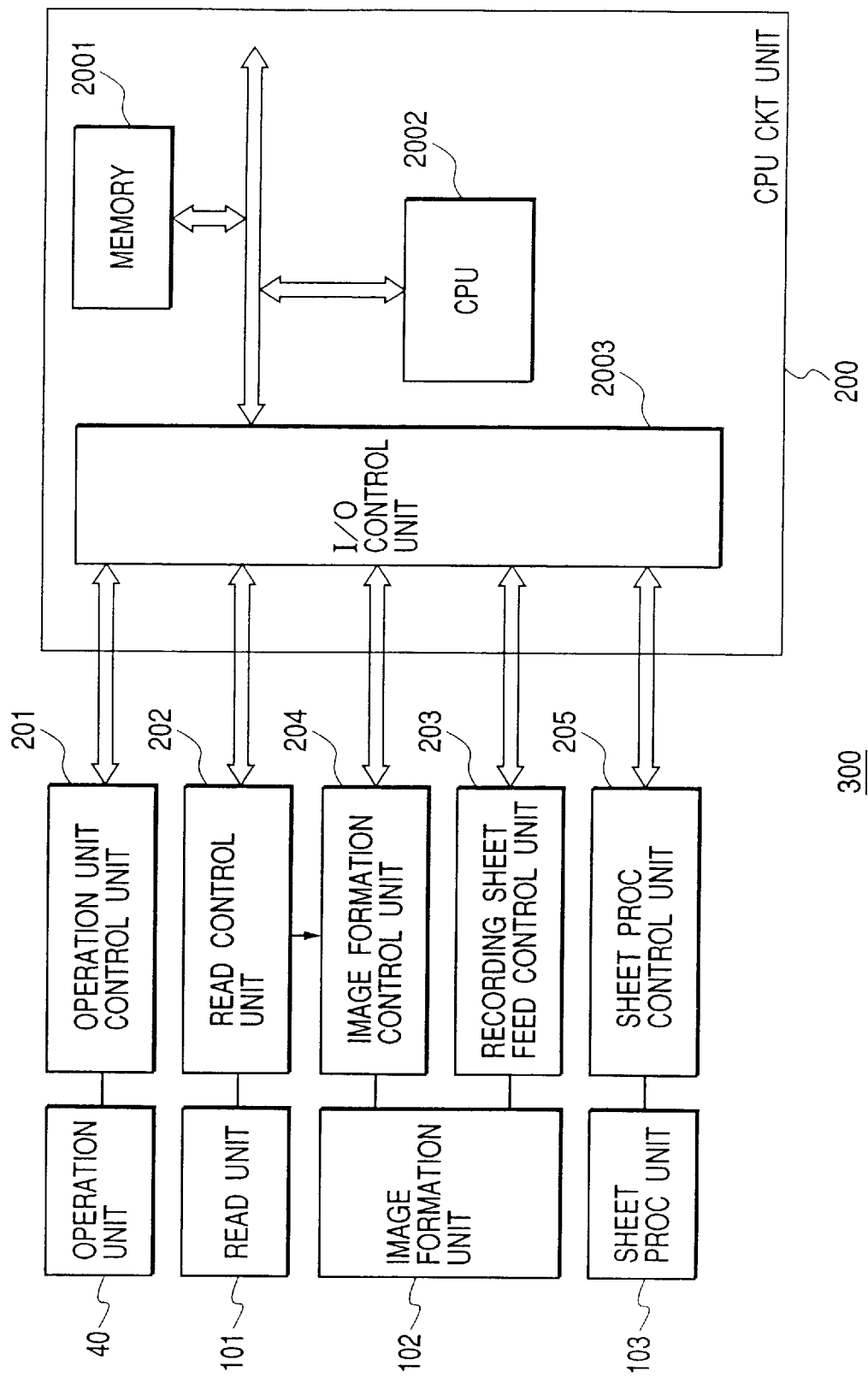
FIG. 3 is a block diagram showing a control unit of the copying machine.

FIG. 3 is a block diagram showing the details of a control unit 300 of the copying machine 1000. A CPU circuit unit 200 includes a CPU (central processing unit) 2002, a ROM (read-only memory), a RAM (random access memory), a memory 2001 and an I/O (input/output) control unit 2003. The CPU 2002 performs calculation and controls an entire process unit on the basis of a predetermined program, the ROM stores therein programs and predetermined data, and the RAM temporarily stores data according to signal processes. The memory 2001 is used when programs and data are written into or read from an IC card, a floppy disk and the like, and the I/O control unit 2003 is to send and control input and output signals.

The memory 2001 and the I/O control unit 2003 are controlled responsive to a control signal from the CPU 2002. Further, an operation unit control unit 201, a read control unit 202, a recording sheet feed control unit 203, an image formation control unit 204 and a sheet process control unit 205 are controlled by the CPU circuit unit 200.

Figure 4:
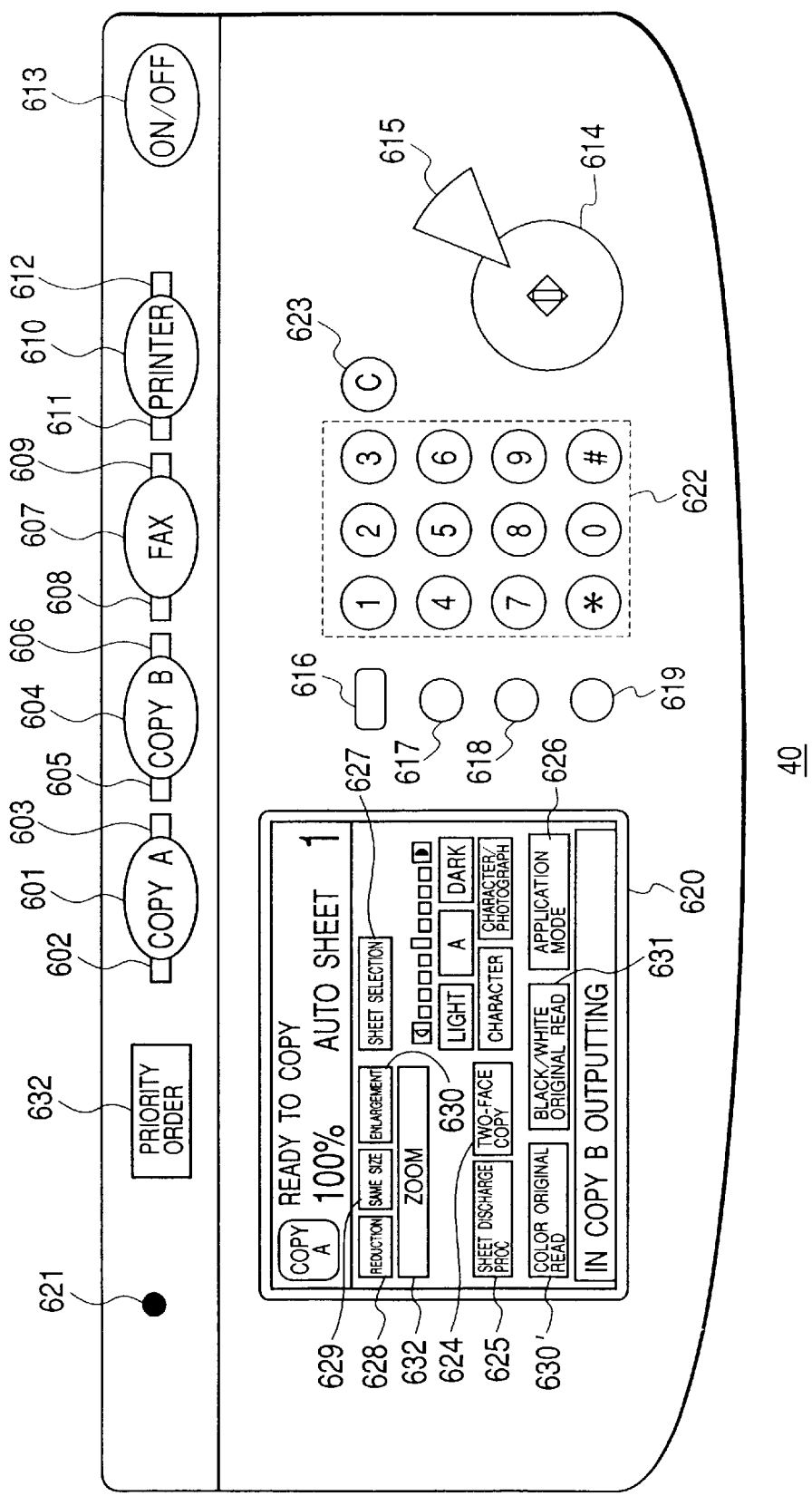
FIG. 4 is a view showing an operation unit of the copying machine.

Next, the operation unit 40 will be explained. FIG. 4 is a view showing the operation unit 40 of the copying machine. A power lamp 621 is the lamp for indicating that a power supply is ON, a power switch 613 is lit and turned off according to ON/OFF of the power supply. A ten key 622 is used when numerical values are input in setting of the number of image formation, setting of operation mode and the like, and is also used when a telephone number is input on a facsimile setting screen.

A clear key 623 is used to clear the setting input by using the ten key 622. A reset key 616 is used to return the set number of image formation, the set operation mode, a selected mode concerning a sheet feed origin, and the like to the former (or default) state.

If a start key 614 is depressed, the image formation operation starts. Not shown red and green LED's (light emitting diodes) are disposed at the center of the start key 614 to indicate whether the image formation process can start or not. If the process can not start, the red LED is lit, while the process can start, the green LED is lit.

A stop key 615 is used to stop the copying operation. If a guide key 617 is depressed and then another key is depressed, the explanation of a function of the latter-depressed key is displayed on a display panel 620. If the guide key 617 is again depressed, the guide display is released.

A user setting key 618 is used to change the setting of the copying machine 1000. For example, the user can change the setting concerning a time required until the setting of the machine 1000 is automatically cleared, the setting concerning a default value of the mode at the time when the reset key 616 is depressed, and the like. If an interruption key 619 is depressed in the image formation operation, the other image formation operations is discontinued.

The display panel 620 is structured by a liquid crystal and the like, and the displayed contents thereof are changed according to the set mode so as to facilitate the detailed mode setting. Since the panel 620 is a touch panel screen, if a box icon representing one function is touched, this function is executed.

The setting screen of a copying operation mode is displayed on the display panel shown in FIG. 4. On the panel 620, keys 624, 625, 626, 627, 628, 629, 630, 630', 631 and 632 are displayed. The user performs the mode setting to the copying machine 1000 by depressing these keys.

The key 627 is used to perform sheet selection, and the keys 628, 629, 630 and 632 are used to set copying magnification in the copying operation.

The application mode key 626 is used to set a multi-copying operation and an application function mode (reduction layout mode, cover/composition mode, etc.). If the application mode key 626 is depressed, the screen to set each application mode is displayed on the display panel 620, whereby the user sets the application function mode on the displayed screen.

The two-face copying operation setting key 624 is used to set, e.g., a "one face→two faces" mode to output a two-face copy from two one-face originals, a "two faces→two faces" mode to output a two-face copy from a two-face original, and a "two faces→one face" mode to output two one-face copies from a two-face original.

The sheet discharge process key 625 is used to set the operation mode of the finisher 103, an output sheet sort mode using an image memory, and an insert mode for the insert process.

The color original read key 630' is used to set an original read mode. Namely, the key 630' is used when a mode to extract and process only color originals in the plural originals P stacked on the tray 50 (i.e., corresponding to a mode to allow execution of a process for discriminating color data or black/white data) is set.

The black/white original read key 631 is used when a mode to extract and process only black/white originals in the plural originals P (i.e., like the above-described mode, corresponding to the mode to allow execution of the process for discriminating the color data or the black/white data) is set.

If either of the color original read key 630' or the black/white original read key 631 is depressed, the key indicating the selected mode is lit, whereby the currently set original read mode can be recognized. Then, if the lit-state key is depressed, the selected mode is released and this key is turned off.

If both the color original read key 630' and the black/white original read key 631 are not lit, there is an initial state, and an ordinary read mode to process all of the plural originals set on the tray 50 irrespective of the color original and the black/white original (i.e., corresponding to a mode to inhibit execution of the process for discriminating the color data or the black/white data) is set. In other words, in the ordinary read mode, the image formation is performed every time the original is read.

If the key which is displayed on the panel 620 and can not be used is represented by a dotted-line (or halftone) icon. Thus the user can easily recognize that he can not use such the key.

On the display screen 620, the contents of the set copying operation and the current operation state are displayed within the range capable of being represented by one line of the upper portion. In FIG. 4, the setting screen of copy A is displayed.

Further, on the display screen 620, the operation state of the other function mode is displayed within the range capable of being represented by one line of the lower portion. In FIG. 4, it is displayed that a copy B is being output to the printer unit.

In FIG. 4, a copy A function key 601, a copy B function key 604, a fax function key 607 and a printer function key 610 are the function keys which are used when the contents displayed on the panel 620 are changed for the setting of the respective functions in the copying operation and the system operation.

Each of these function keys is made of a semitransparent keybutton, and includes a display lamp (not shown) such as an LED or the like. Thus, only the lamp in the key corresponding to the selected operation screen is controlled to be lit. Green LED's 603, 606, 609 and 612 respectively disposed at the rights of the function keys 601, 604, 607 and 610 are controlled to be lit such that they represent the operation states in the respective functions.

For example, if the copy B function key 604 is depressed, the operation screen of copy B is displayed on the display panel 620. If the copy B is on standby, the LED 606 of the copy B is off. As shown in FIG. 4, if the copy B is being output, the LED 606 is controlled to be blinked. Further, if the image of the copy B has been stored in the memory 2001 and the printing operation of the copy B is not performed, the LED 606 is controlled to be lit.

Red LED's 602, 605, 608 and 611 respectively disposed at the left of the function keys 601, 604, 607 and 610 are controlled to be lit to represent that abnormality occurs in the respective functions. For example, if the abnormality such as sheetless interruption or jam occurs in the copy B output, the LED 605 of copy B is controlled to be blinked. At this time, if the user depresses the copy B function key 604, the abnormality state of copy B is displayed, whereby he can know the details of the abnormality. The function keys 601, 604, 607 and 610 can be depressed in any operation state, and thus the contents to be displayed on the panel 620 are changed, thereby changing the function of the operation unit 40. The stop key 615, the start key 614, the reset key 616 and the like which are not disposed on the display panel 620 can cope with the function selected from among the function keys 601, 604, 607 and 610.

For example, as shown in FIG. 4, when the operation screen of copy A is being displayed on the panel 620, if the copy B function key 604 is depressed to change the operation screen and then the stop key 615 is depressed, the copying operation of copy B is stopped. Further, since the contents changed by the user setting key 618 have been reflected in the function selected at the changing time, the user setting can be performed independently to each function.

Figure 5:
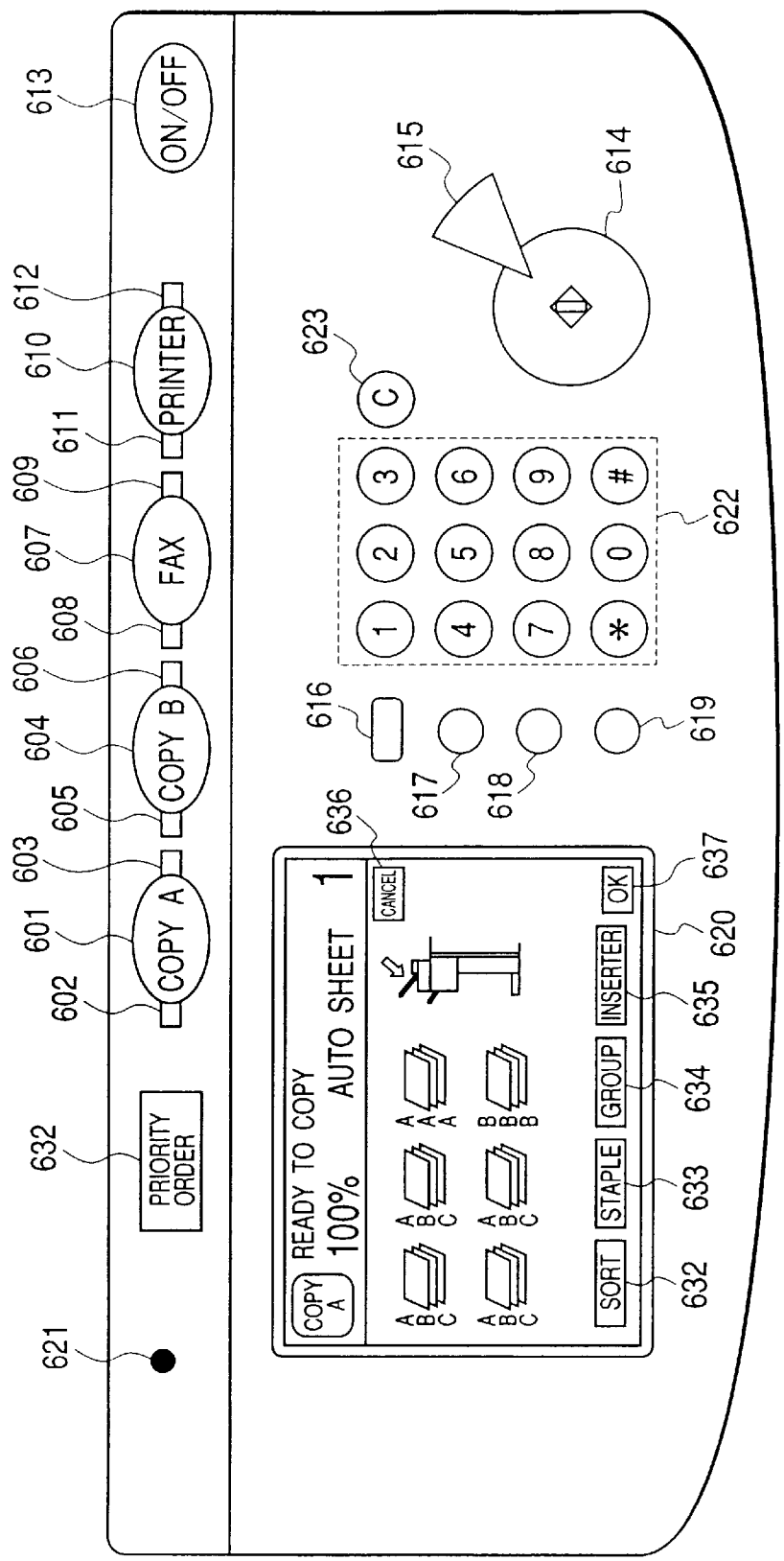
FIG. 5 is a view showing the operation unit of the copying machine.

FIG. 5 is a view showing a sheet discharge process setting screen displayed on the display panel 620 when the sheet discharge process key 625 is depressed. A sheet discharge mode is selected on this screen.

A sort key 632 is used to set the sheet discharge process in a sort mode, a staple key 633 is used to set a staple process mode for the sorted output sheets, and a group key 634 is used to set a group mode in which copies of one original are discharged to one bin.

An inserter key 635 is used to set the insert mode to perform the insert process using the inserter 104. If the insert mode is set by the user, the insert sheet I set on the tray 20 of the inserter 104 is fed to either of the sample tray 85 or the stack tray 86 without passing the image formation unit 102. Thus, the insert sheet I set on the inserter 104 can be inserted between the successive recording sheets fed from the image formation unit 102 to the finisher 103.

It should be noted that the above-described keys to set such the sheet discharge process are exclusive, and that the sheet discharge mode can be selected from any mode.

A cancel key 636 is used to cancel the setting of the sheet discharge process mode. An OK key 637 is used to settle the setting of the sheet discharge process mode selected on the sheet discharge process setting screen.

Next, the process relative to the original read mode based on the color original read key 630, the black/white original read key 631 and the like displayed on the panel 620 of FIG. 4 will be explained with respect to a flow chart shown in FIG. 6.

This process is performed by the CPU 2002 of the CPU circuit unit 200 when the image formation process for the plural originals P stacked on the tray 50 starts.

First, it is judged whether or not the color original read key 630 is selected at the operation unit (step S001). If judged in the step S001 that the key 630 is selected, then the color original read mode is set (step S005).

Conversely, if judged in the step S001 that the key 630 is not selected, then it is judged whether or not the black/white original read key 631 is selected at the operation unit (step S002).

If judged in the step S002 that the key 631 is selected, then the black/white original read mode is set (step S004).

Conversely, if judged in the step S002 that the key 631 is not selected, the ordinary read mode is set (step S003).

Next, it is judged whether or not the copy start key 614 of the operation unit 40 is depressed (step S006). If judged in the step S006 that the key 614 is not depressed, then the flow return to the step S001.

Conversely, if judged in the step S006 that the key 614 is depressed, then the original reading process is performed (step S007). Next, it is judged whether or not the original read mode is the ordinary read mode (step S008).

If judged in the step S008 that the original read mode is the ordinary read mode, then the image data of the original read in the step S007 is printed out (step S011). Namely, in the ordinary read mode, all the originals read are printed out without performing any color discrimination process.

Conversely, if judged in the step S008 that the original read mode is not the ordinary read mode, then it is judged whether or not the original read in the step S007 is the black/white original (step S009).

If judged in the step S009 that the read original is the black/white original, then it is judged whether or not the original read mode is the black/white original read mode (step S010).

Conversely, if judged in the step S009 that the read original is not the black/white original, then it is judged whether or not the original read mode is the color original read mode (step S012).

If judged in the step S010 that the original read mode is the black/white original read mode, the image data of the original read in the step S007 is printed out (step S011). Then it is judged whether or not the original to which the reading process is not yet performed in the step S007 still remains in the plural originals stacked on the tray 50 (step S013).

If judged in the step S010 that the original read mode is not the black/white original read mode, the image data of the original read in the step S007 is not printed out, and the flow advances to the step S013.

If judged in the step S012 that the original read mode is the color original read mode, the flow advances to the step S011, while if judged that the mode is not the color original read mode, the flow advances to the step S013.

If judged in the step S013 that the original to which the reading process is not yet performed in the step S007 still remains, the flow returns to the step S007 to read such the remaining original. On the other hand, if judged in the step S013 that there is no original to which the reading process is not yet performed, the process ends.

Although the copying machine 1000 which performs black/white outputting has been explained in the present embodiment, the present invention is applicable to the copying machine which can perform color outputting.

By the above-described process, in a case where the plural originals mixedly including the color originals and the black/white originals are copied, only the black/white originals can be printed out, or only the color originals can be printed out. Thus, the operation to be performed by the user in the case where the plural originals mixedly including the color originals and the black/white originals are copied can be simplified, thereby reducing user's annoyingness.

Therefore, for example, in the case where the user intends to print out the black/white originals by the black/white copying machine and print out the color originals by the color copying machine, it is possible to omit the conventional trouble that the user previously divides the plural originals into the black/white originals and the color originals and then returns the divided originals to the former state.

FIG. 7 is a flow chart of a process concerning the mode setting for the copying machine 1000. This process is performed by the CPU 2002 of the CPU circuit unit 200 when the image formation process for the plural originals P stacked on the tray 50 starts.

First, it is judged whether or not the insert sheet I is set on the tray 20 of the inserter 104 on the basis of the detection of the insert sheet setting detection sensor 27 (step S701).

If judged in the step S701 that the insert sheet I is set to the inserter 104, the color original discrimination mode is set for the copying machine 1000 (step S702), and the process ends.

The color original discrimination mode in the step S702 is to discriminate whether the original is the color original or the black/white original on the basis of the image data of the original P, when the original P is read by the read unit 101.

Conversely, if judged in the step S701 that the insert sheet I is not set, the mode not to perform the color original discrimination is set for the copying machine 1000 (step S703), and the process ends.

FIG. 8 is a flow chart showing a process to be performed when, from the plural originals P stacked on the tray 50, only the color originals are printed out.

This process is performed by the CPU 2002 of the CPU circuit unit 200 when the image formation process for the plural originals P stacked on the tray 50 starts.

First, it is judged whether or not the copy start key 614 is depressed by the user on the operation unit 40 (step S801). Such the judgment in the step S801 is repeated until the copy start key 614 is depressed on the operation unit 40.

If judged in the step S801 that the key 614 is depressed by the user, then it is judged whether or not the insert sheet I is set on the tray 20 of the inserter 104 on the basis of the detection of the insert sheet setting detection sensor 27 (step S802).

If judged in the step S802 that the insert sheet I is set to the inserter 104, the color original discrimination mode is set for the copying machine 1000 (step S803), and the reading process is performed to the original P (step S804).

The color original discrimination mode in the step S803 is to discriminate whether the original is the color original or the black/white original on the basis of the image data of the original P, when the original P is read by the read unit 101.

Conversely, if judged in the step S802 that the insert sheet I is not set to the inserter 104, the mode not to perform the color original discrimination is set for the copying machine 1000 (step S808), the reading process is performed to the original P (step S809), and the image data of the read original is printed out (step S810). Then it is judged whether or not the original to which the reading process is not yet performed in the step S809 still remains in the plural originals P stacked on the tray 50 (step S811).

If judged in the step S811 that the original to which the reading process is not yet performed still remains, the flow returns to the step S809 to read such the remaining original. On the other hand, if judged that there is no original to which the reading process is not yet performed, the process ends.

After the reading process is performed to the original P in the step S804, it is judged whether the read original is the color original or the black/white original (step S805).

If judged in the step S805 that the original is the color original, then the image data of the original read in the step S804 is printed out (step S806). Then it is judged whether or not the original to which the reading process is not yet performed in the step S804 still remains in the plural originals P stacked on the tray 50 (step S807).

Conversely, if judged in the step S805 that the original is not the color original, the image data of the original read in the step S804 is not printed out, and the flow advances to the step S807.

If judged in the step S807 that the original to which the reading process is not yet performed in the step S804 still remains, the flow returns to the step S804 to read such the remaining original. On the other hand, if judged that there is no original to which the reading process is not yet performed in the step S804, the process ends.

FIG. 9 is a flow chart showing a process to be performed when, from the plural originals P stacked on the tray 50, only the black/white originals are printed out.

This process is performed by the CPU 2002 of the CPU circuit unit 200 when the image formation process for the plural originals P stacked on the tray 50 starts.

First, it is judged whether or not the copy start key 614 is depressed by the user on the operation unit 40 (step S901). Such the judgment in the step S901 is repeated until the copy start key 614 is depressed on the operation unit 40.

If judged in the step S901 that the key 614 is depressed by the user, then it is judged whether or not the insert sheet I is set on the tray 20 of the inserter 104 on the basis of the detection of the insert sheet setting detection sensor 27 (step S902).

If judged in the step S902 that the insert sheet I is set to the inserter 104, the color original discrimination mode is set for the copying machine 1000 (step S903), and the reading process is performed to the original P (step S904).

The color original discrimination mode in the step S903 is to discriminate whether the original is the color original or the black/white original on the basis of the image data of the read original, when the original P is read by the read unit 101.

Conversely, if judged in the step S902 that the insert sheet I is not set to the inserter 104, the mode not to perform the color original discrimination is set for the copying machine 1000 (step S908), the reading process is performed to the original P (step S909), and the image data of the read original is printed out (step S910). Then it is judged whether or not the original to which the reading process is not yet performed in the step S909 still remains in the plural originals P stacked on the tray 50 (step S911).

If judged in the step S911 that the original to which the reading process is not yet performed still remains, the flow returns to the step S909 to read such the remaining original. On the other hand, if judged that there is no original to which the reading process is not yet performed, the process ends.

After the reading process is performed to the original P in the step S904, it is judged whether the read original is the color original or the black/white original (step S905).

If judged in the step S905 that the read original is not the color original, then the image data of the original read in the step S904 is printed out (step S906). Then it is judged whether or not the original to which the reading process is not yet performed in the step S904 still remains in the plural originals P stacked on the tray 50 (step S907).

Conversely, if judged in the step S905 that the read original is the color original, the image data of the original read in the step S904 is not printed out, and the flow advances to the step S907.

If judged in the step S907 that the original to which the reading process is not yet performed in the step S904 still remains, the flow returns to the step S904 to read such the remaining original. On the other hand, if judged that there is no original to which the reading process is not yet performed in the step S904, the process ends.

By the processes shown in FIGS. 8 and 9, in the case where there are the sheets on the inserter 104, the mode to judge whether or not the color original is present in the plural originals stacked on the original stack tray 50 can be automatically set, whereby it is possible to print out only the black/white original or the color original from among the plural originals stacked on the tray 50. Thus, it is possible to simplify the operation to be performed by the user when the insert process to insert the insert sheet set to the inserter 104 between the successive sheets fed from the image formation unit 102 into the finisher 103.

FIG. 10 is a flow chart showing a process of the insert mode. As described above, the insert mode is to perform the insert process.

This process is performed by the CPU 2002 of the CPU circuit unit 200 when the image formation process for the plural originals P stacked on the tray 50 starts.

First, it is judged whether or not the insert sheet I is set on the tray 20 of the inserter 104 on the basis of the detection of the insert sheet setting detection sensor 27 (step S1001).

If judged in the step S1001 that the insert sheet I is set to the inserter 104, the color original discrimination mode is set for the copying machine 1000 (step S1002), and the above-described insert mode is set (step S1004). Then the process ends.

The color original discrimination mode in the step S1002 is to discriminate whether the original is the color original or the black/white original on the basis of the image data of the read original, when the original P is read by the read unit 101.

Conversely, if judged in the step S1001 that the insert sheet I is not set to the inserter 104, the mode not to perform the color original discrimination is set for the copying machine 1000 (step S1003), and a non-insert mode is set not to perform the insert process (step S1005). Then the process ends.

Figure 11:
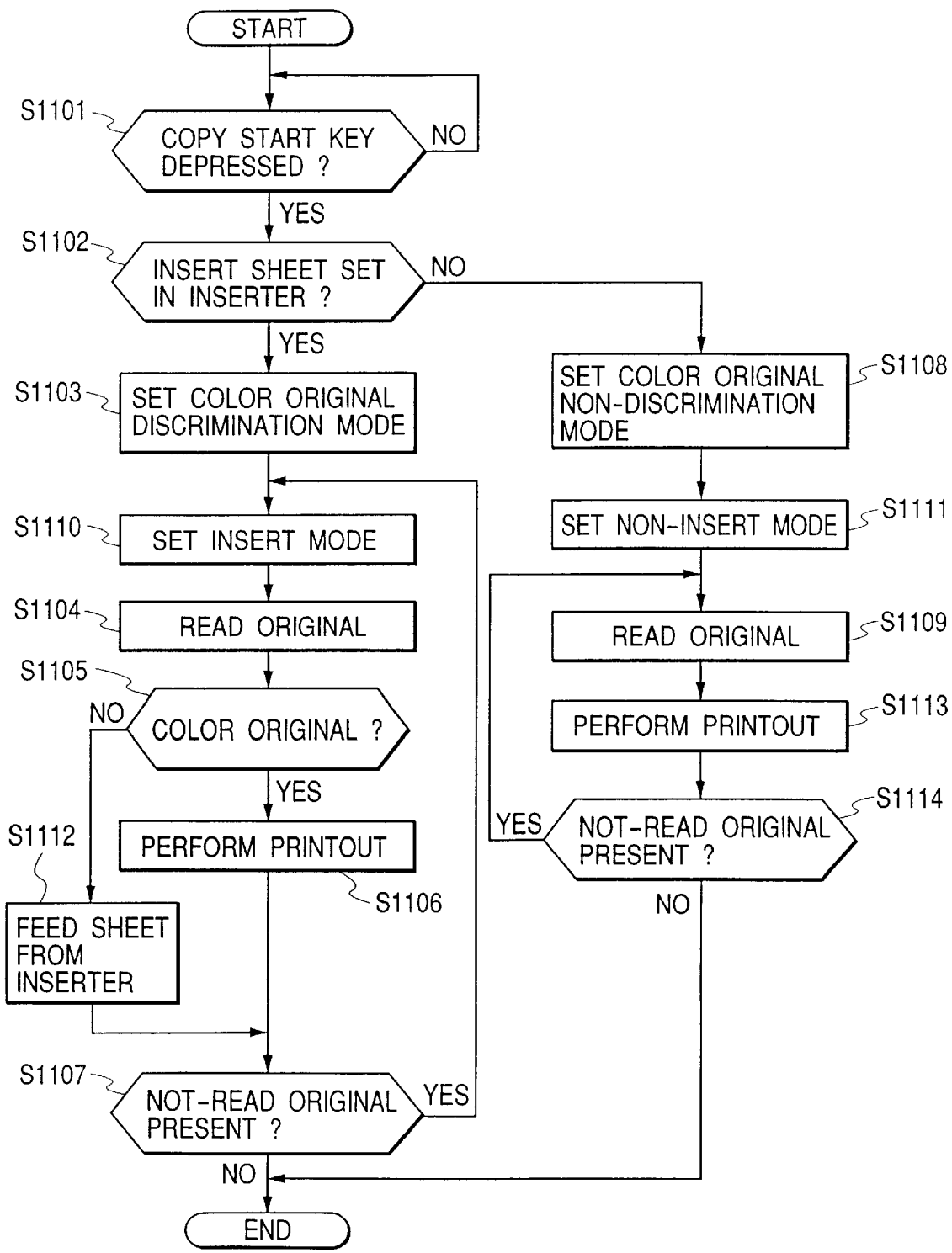
FIG. 11 is a flow chart showing a process to be performed when, from the plural originals, only the color originals are printed out and also an insert process is performed.

FIG. 11 is a flow chart showing a case where only the color originals from among the plural originals P are printed out and also the insert process is performed.

As described above, the insert mode is to feed the insert sheet I set on the tray 20 of the inserter 104 to either of the sample tray 85 or the stack tray 86 without passing the image formation unit 102, and is to insert the insert sheet I between the successive sheets fed from the image formation unit 102 into the finisher 103.

In the insert process, it is assumed that the sheaf of sheet is set faceup on the tray 20 of the inserter 104 by the user and the sheets (insert sheets I) are sequentially fed one by one from the uppermost one. Therefore, since the sheet from the inserter 104 is carried directly to the sample tray 85 or the stack tray 86 through the carrying rollers 23, 24 and 25, this sheet is discharged facedown.

Further, as described above, the plural originals P are set faceup on the original stack tray 50 by the user, and the stacked originals P are sequentially read from the uppermost one by the read unit 101. Then, in case of performing the insert process by using the inserter 104, the recording sheet is switchbacked at the side of the image formation unit 102 and fed facedown to the finisher 103. Next, at the side of the finisher 103, the fed recording sheet is discharged facedown to the sample tray 85 or the stack tray 86 as it is. Thus, the face of the insert sheet I carried from the inserter 104 can be matched with that of the recording sheet S carried from the image formation unit 102.

The process shown in FIG. 11 is performed by the CPU 2002 of the CPU circuit unit 200 when the image formation process for the plural originals P stacked on the tray 50 starts.

First, it is judged whether or not the copy start key 614 is depressed by the user on the operation unit 40 (step S1101). Such the judgment in the step S1101 is repeated until the copy start key 614 is depressed on the operation unit 40.

If judged in the step S1101 that the key 614 is depressed by the user, then it is judged whether or not the insert sheet I is set on the tray 20 of the inserter 104 on the basis of the detection result of the insert sheet setting detection sensor 27 (step S1102).

If judged in the step S1102 that the insert sheet I is set to the inserter 104, the color original discrimination mode is set for the copying machine 1000 (step S1103), the insert mode is set (step S1110), and the reading process is performed to the original P (step S1104).

The color original discrimination mode in the step S1103 is to discriminate whether the original is the color original or the black/white original on the basis of the image data of the read original, when the original P is read by the read unit 101. Further, as described above, the insert mode is to perform the insert process.

Conversely, if judged in the step S1102 that the insert sheet I is not set to the inserter 104, the mode not to perform the color original discrimination is set for the copying machine 1000 (step S1108), the non-insert mode is set not to perform the insert process (step S1111), the reading process is performed to the original P (step S1109), and the image data of the read original is printed out (step S1113). Then it is judged whether or not the original to which the reading process is not yet performed in the step S1109 still remains in the plural originals P stacked on the tray 50 (step S1114). That is, if it is detected that the sheet is not set to the inserter 104, the color original discrimination (including the insert process) is inhibited, and all the data subjected to the reading process are printed out. (Every time the original is read, the image formation process based on the image data of the read original is performed.)

If judged in the step S1114 that the original to which the reading process is not yet performed still remains, the flow returns to the step S1109 to read such the remaining original. On the other hand, if judged that there is no original to which the reading process is not yet performed, the process ends.

After the reading process is performed to the original P in the step S1104, it is judged whether the read original is the color original or the black/white original (step S1105).

If judged in the step S1105 that the read original is the color original, then the image data of the original read in the step S1104 is printed out (step S1106). Then it is judged whether or not the original to which the reading process is not yet performed in the step S1104 still remains in the plural originals P stacked on the tray 50 (step S1107).

Conversely, if judged in the step S1105 that the read original is not the color original, the image data of the original read in the step S1104 is not printed out. Instead, the insert sheet I on the tray 20 of the inserter 104 is fed to the sheet discharge tray such as the sample tray 85 (step S1112), and the flow advances to the step S1107.

If judged in the step S1107 that the original to which the reading process is not yet performed in the step S1104 still remains, the flow returns to the step S1110 to read such the remaining original. On the other hand, if judged that there is no original to which the reading process is not yet performed in the step S1104, the process ends.

Figure 12:
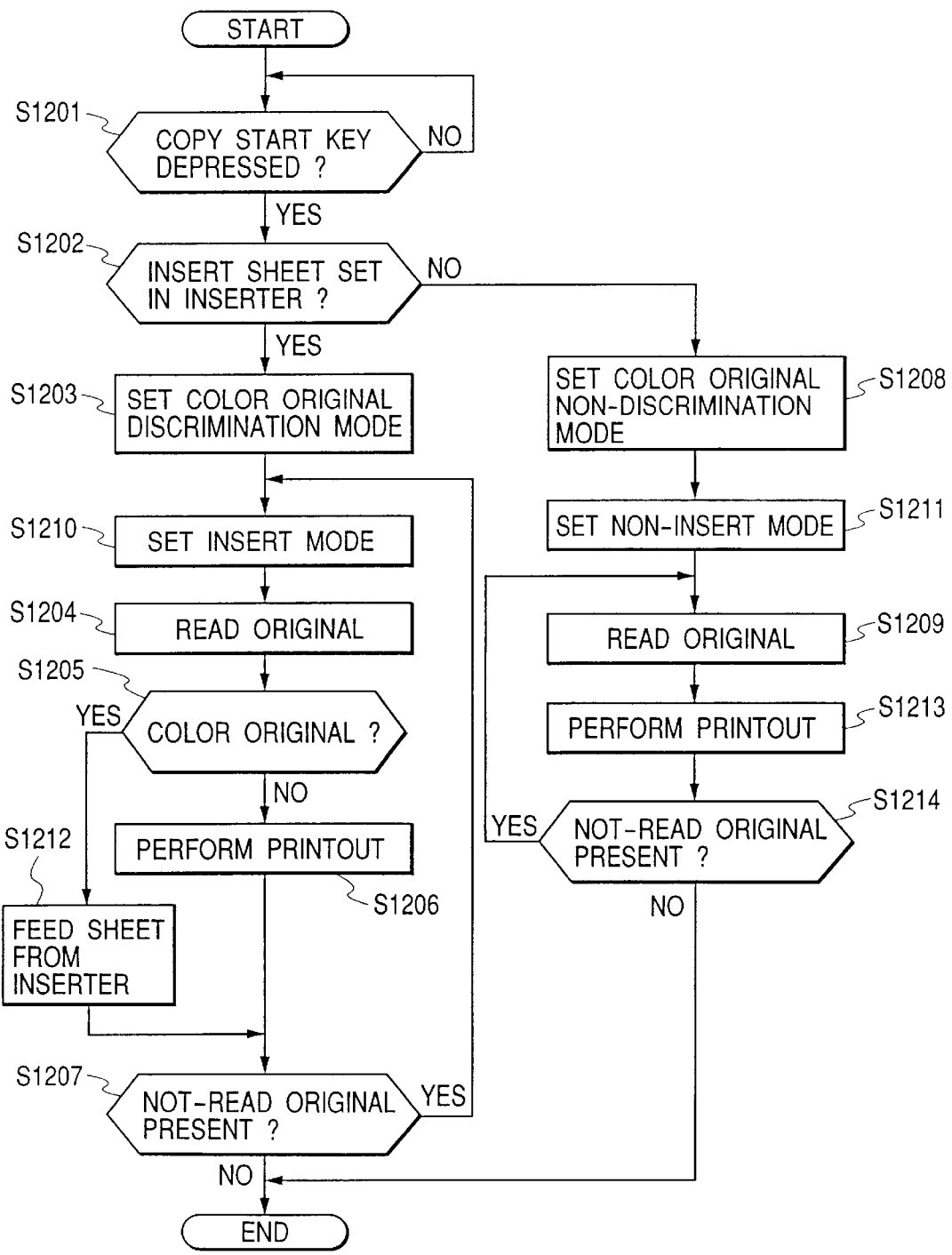
FIG. 12 is a flow chart showing a process to be performed when, from the plural originals, only the black/white originals are printed out and also the insert process is performed.

FIG. 12 is a flow chart showing a case where only the black/white originals from among the plural originals P stacked on the tray 50 are printed out and also the insert process is performed.

This process is performed by the CPU 2002 of the CPU circuit unit 200 when the image formation process for the plural originals P stacked on the tray 50 starts.

First, it is judged whether or not the copy start key 614 is depressed by the user on the operation unit 40 (step S1201). Such the judgment in the step S1201 is repeated until the copy start key 614 is depressed on the operation unit 40.

If judged in the step S1201 that the key 614 is depressed by the user, then it is judged whether or not the insert sheet I is set on the tray 20 of the inserter 104 on the basis of the detection of the insert sheet setting detection sensor 27 (step S1202).

If judged in the step S1202 that the insert sheet I is set to the inserter 104, the color original discrimination mode is set for the copying machine 1000 (step S1203), the insert mode is set (step S1210), and the reading process is performed to the original P (step S1204).

The color original discrimination mode in the step S1203 is to discriminate whether the original is the color original or the black/white original on the basis of the image data of the read original, when the original P is read by the read unit 101. Further, the insert mode is to perform the insert process.

Conversely, if judged in the step S1202 that the insert sheet I is not set to the inserter 104, the mode not to perform the color original discrimination is set for the copying machine 1000 (step S1208), the non-insert mode is set not to perform the insert process (step S1211), the reading process is performed to the original P (step S1209), and the image data of the read original is printed out (step S1213). Then it is judged whether or not the original to which the reading process is not yet performed in the step S1209 still remains in the plural originals P stacked on the tray 50 (step S1214). That is, if it is detected that the sheet is not set to the inserter 104, the color original discrimination (including the insert process) is inhibited, and all the data subjected to the reading process are printed out. (Every time the original is read, the image formation process based on the image data of the read original is performed.)

If judged in the step S1214 that the original to which the reading process is not yet performed still remains, the flow returns to the step S1209 to read such the remaining original. On the other hand, if judged that there is no original to which the reading process is not yet performed, the process ends.

After the reading process is performed to the original P in the step S1204, it is judged whether the read original is the color original or the black/white original (step S1205).

If judged in the step S1205 that the read original is not the color original, then the image data of the original read in the step S1204 is printed out (step S1206). Then it is judged whether or not the original to which the reading process is not yet performed in the step S1204 still remains in the plural originals P stacked on the tray 50 (step S1207).

Conversely, if judged in the step S1205 that the read original P is the color original, the image data of the original read in the step S1204 is not printed out. Instead, the insert sheet I on the tray 20 of the inserter 104 is fed to the sheet discharge tray such as the sample tray 85 (step S1212), and the flow advances to the step S1207.

If judged in the step S1207 that the original to which the reading process is not yet performed in the step S1204 still remains, the flow returns to the step S1210 to read such the remaining original. On the other hand, if judged that there is no original to which the reading process is not yet performed in the step S1204, the process ends.

By the above-described process shown in FIGS. 11 and 12, in the case where there are the sheets on the inserter 104, the mode to judge whether or not the color original is present in the plural originals stacked on the original stack tray 50 can be automatically set, whereby it is possible to print out only the black/white original or the color original from among the plural originals stacked on the tray 50. Further, the sheet set to the inserter 104 can be inserted between the successive sheets fed from the image formation unit 102 into the finisher 103. Thus, it is possible to simplify the operation to be performed by the user when the plural originals mixedly including the color originals and the black/white originals are copied.

Although the copying machine 1000 in the present embodiment is the copying machine which performs the black/white outputting to form the black/white image data on the recording sheet, the present invention is applicable to a copying machine which can perform color outputting to form the color image data on the recording sheet.

Figure 13:
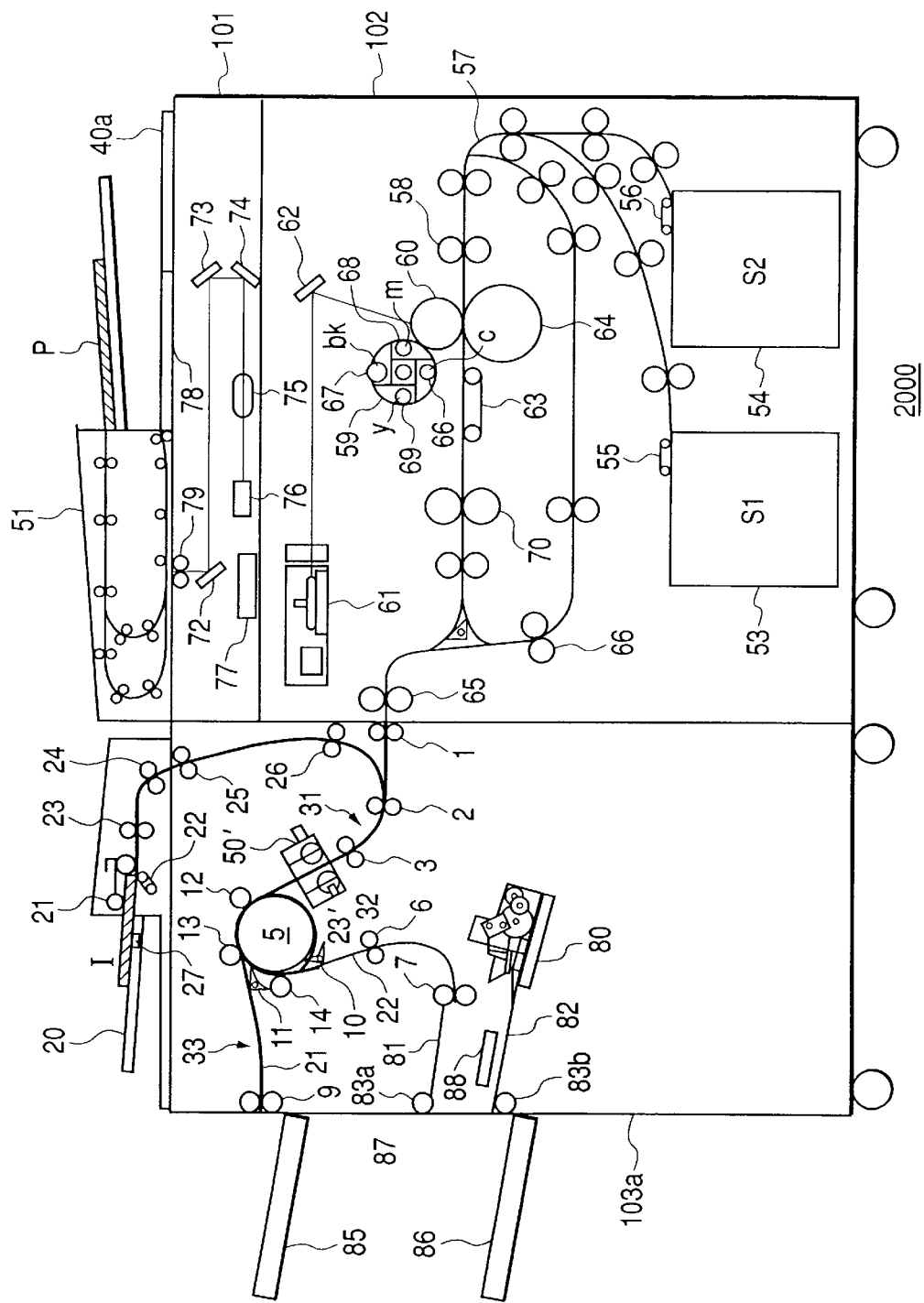
FIG. 13 is a sectional view showing a copying machine capable of performing color outputting.

FIG. 13 is a sectional view showing an internal structure of a copying machine (i.e., color copying machine) capable of performing color outputting.

The internal structure of a color copying machine 2000 shown in FIG. 13 is substantially the same as that of the copying machine 1000 shown in FIG. 1. Further, the color copying machine 2000 contains a rotary development unit 59 which is composed of a magenta development unit 68, a cyan development unit 66, an yellow development unit 69 and a black development unit 67.

By rotating the development unit 59, the respective development units sequentially come into contact with a photosensitive drum 60, thereby visualizing an electrostatic latent image on the drum 60 as a toner image. A recording sheet S fed up to a transfer drum 64, the drum is wound with the sheet S, and the toner image on the photosensitive drum 60 is transferred onto the sheet S on the transfer drum 64.

The recording sheet S on which the M, Y, C and BK colors have been sequentially transferred passes a carrying belt 63 and a fixing unit 70. Then the sheet S is carried to a carrying path of a finisher 103*a* by a carrying roller 65.

Like the copying machine 1000, the copying machine 2000 includes an operation unit 40*a* which is used to perform operation setting, confirmation of the setting contents and the like for the finisher 103*a*.

Next, a method to copy the plural originals P mixedly including the color originals and the black/white originals (referred simply as originals P hereinafter) by using the copying machine 1000 performing the black/white outputting and the color copying machine 2000 capable of performing the color outputting will be explained with reference to an image formation system shown in FIGS. 14A and 14B.

First, the user sets the originals P faceup on the original stack tray 50 of the black/white copying machine 1000 (step (1)), selects the black/white original read key 631 on the display panel shown in FIG. 4, and then depresses the copy start key 614 (step (2)).

Figure 6:
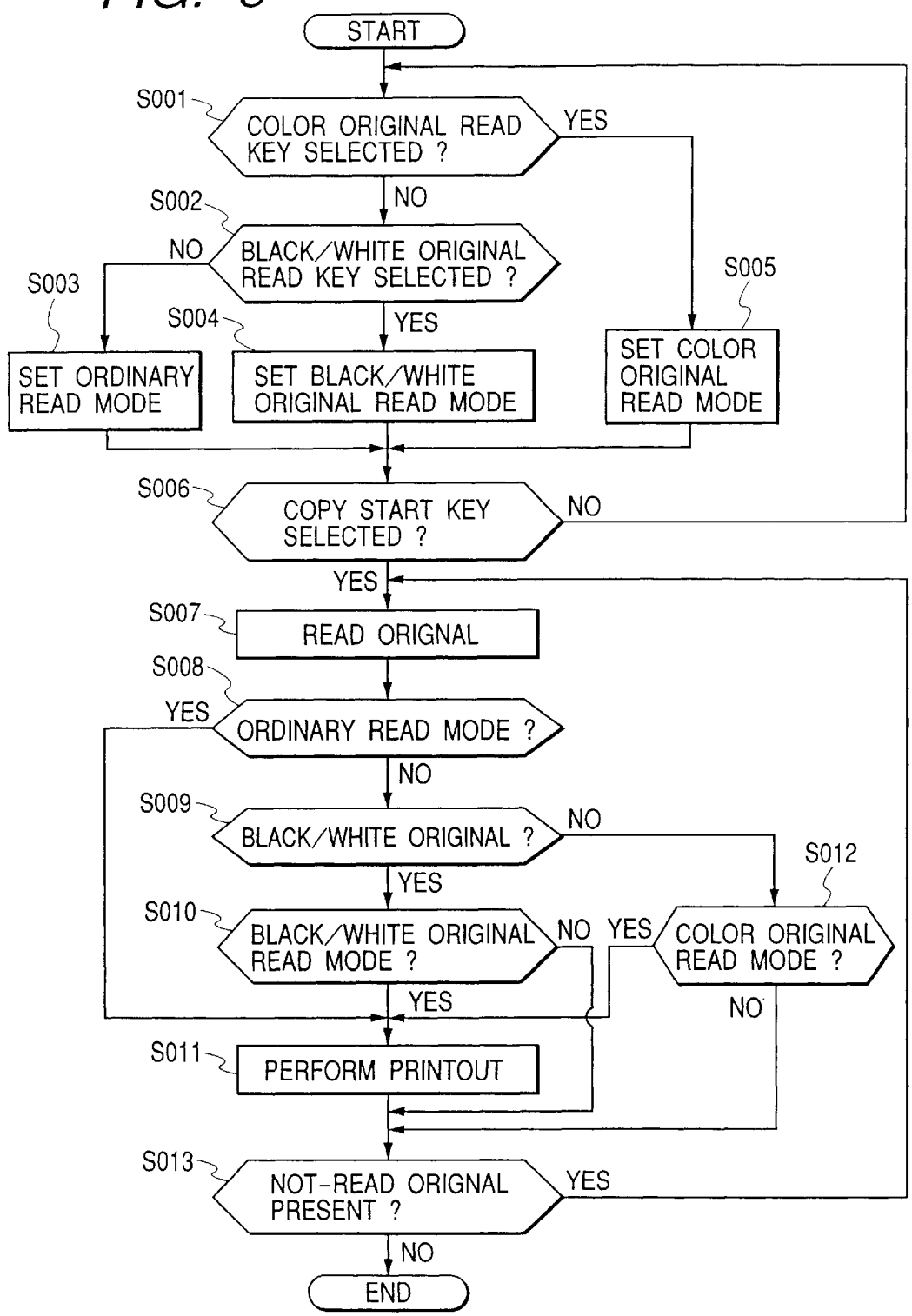
FIG. 6 is a flow chart of a process concerning an image read mode.

The black/white copying machine 1000 performs the process shown in FIG. 6, on the basis of the user's operation. By this process, only the black/white originals in the originals P are black/white output (step (3)).

Next, the sheet which was black/white output by the copying machine 1000 and then stacked on the sample tray 85 is carried by the user from the tray 85 and set faceup onto a tray 20*a* of an inserter 104*a* of the color copying machine 2000 (step (4)). Further, the original P which was subjected to the reading process by the copying machine 1000 is carried by the user from the original mounting board of the copying machine 1000 and set faceup onto an original stack tray 50*a* of the copying machine 2000 (step (5)). Then the copy start key (not shown) of the operation unit 40*a* of the copying machine 2000 is depressed (step (6)).

The copying machine 2000 performs the process shown in FIG. 11 on the basis of user's operation. That is, the original P stacked on the tray 50*a* is subjected to the reading process in the process shown in FIG. 11. In this case, the reading process is sequentially performed from the uppermost one of the originals stacked on the tray 50*a*.

If the original subjected to the reading process is the color original, the image formation process for this color original is performed. In this case, the color output sheet is discharged facedown onto the sample tray 85*a* (step (7)).

On the other hand, if the original subjected to the reading process is the black/white original, the image formation for this black/white original is not performed. That is, the insert sheet which was black/white output by the copying machine 1000 corresponding to this black/white original is discharged facedown onto the sample tray 85*a* (step (7)).

When the insert sheet stacked on the tray 20*a* is fed to the sample tray 85*a*, such the feeding is sequentially performed from the uppermost insert sheet stacked on the tray 20*a*.

By the above-described process, since the insert sheet black/white output by the copying machine 1000 can be inserted between the successive recording sheets color output by the copying machine 2000, the operation to be performed by the user when the plural originals mixedly including the color originals and the black/white originals are copied can be simplified, thereby reducing user's annoyingness.

Therefore, for example, in the case where the recording sheets printed out by the black/white copying machine are the recording sheets printed out by the color copying machine are put into one, it is unnecessary for the user to appropriately insert the recording sheets output from one copying machine into the recording sheets output from the other copying machine.

As described above, according to the present embodiment, when the start key is depressed by the user, it is discriminated by the sensor whether or not the original is set to the inserter. Then whether to perform the mode (color original discrimination mode) that a color and black/white discrimination process is performed or the mode (no color original discrimination mode) that the color and black/white discrimination process is not performed is determined based on the discriminated result. Thus, the user who uses the inserter may only set the original to the original mounting board and the insert sheet to the inserter, whereby the user's operation necessary in case of using the inserter can be simplified, and also user's erroneous operation and the like can be prevented.

On the other hand, the user who does not use the inserter and wishes an ordinary copying operation does not need to select the no color original discrimination mode. Namely, set such the no color original discrimination mode can be automatically selected, whereby the user can ordinarily perform the copying process. Further, since the color and black/white discrimination process is not performed, the time necessary for the color discrimination process can be shortened, thereby increasing processing speed.

Further, in such an environment as shown in FIGS. 14A and 14B that the color image formation apparatus and the black/white image formation apparatus are present, the color discrimination process and the insert process can be performed independently for each of the image formation apparatus, whereby the process mixedly including the black/white output data and the color output data can be performed for one apparatus without depending on the other apparatus. Thus, even if the network is not used, the insert process can be easily performed. Further, the color and black/white discrimination process is performed in real time every time the original is set to the original mounting board, and the image formation process or the sheet feed process from the inserter is performed every time the color and black/white discrimination process. Thus, there is no need to store management information (e.g., page number information) for the insert process into the memory within the apparatus, whereby the insert process can be performed without any complication.

As explained above, according to the present embodiment, the image data is subjected to the reading process, it is judged based on the result of the reading process whether or not the read image data represents the color image, and it is controlled based on the judged result whether or not the image formation of the image data is to be performed. Thus, the operation to be performed by the user when the plural originals mixedly including the color originals and the black/white originals are copied can be simplified, thereby reducing user's annoyingness. For example, in the case where the user intends to print out the black/white originals by the black/white copying machine and print out the color originals by the color copying machine, it is possible to omit the conventional trouble that the user previously divides the plural originals into the black/white originals and the color originals and then returns the divided originals to the former state after the originals are printed out.

In addition, since it is controlled to feed the sheet stacked on the tray of the inserter to the discharge tray of the image formation apparatus (e.g., sample tray), according as the image data is judged to represent the color image. Therefore, for example, in the case where the recording sheets printed out by the black/white copying machine are the recording sheets printed out by the color copying machine are put into one, it is unnecessary for the user to appropriately insert the recording sheets output from one copying machine into the recording sheets output from the other copying machine, thereby reducing user's annoyingness.

Needless to say, the present invention can be achieved in a case where a storage medium storing the program codes of a software for realizing the function (e.g., the processes shown in the flow charts of FIGS. 6 to 12, and the processes relative thereto) of the above-described embodiment is supplied to a system or an apparatus and a computer (CPU or MPU) in the system or the apparatus reads and executes the program codes stored in the memory medium.

In such case the program codes themselves read from the storage medium realize the function of the embodiment, and the storage medium storing such the program codes constitute the present invention.

The storage medium storing such the program codes can be, for example, a floppy disk, a hard disk, an optical disk, a magnetooptical disk, a CD-ROM, a CD-R, a magnetic tape, a non-volatile memory card, a ROM, or the like.

Needless to say, the present invention also includes, not only the case where the function of the embodiment is realized by the execution of the program codes read by the computer, a case where an OS (operating system) or the like functioning on the computer executes all the process or a part thereof according to the instructions of the program codes, thereby realizing the function of the embodiment.

Needless to say, the present invention further includes a case wherein the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the embodiments.

In the present embodiment, although the apparatus wherein the laser beam electrophotographic system is applied to the printing mechanism has been explained by way of example, the present invention is not limited to this. That is, needless to say, any printing system (e.g., LED printing system, thermal transfer printing system, inkjet printing system, etc.) is applicable.

The present invention has been described in connection with the preferred embodiment. The present invention is not limited only to the above-described embodiment, but it is apparent that various modifications and applications are possible within the scope of the appended claims.

What is claimed is:

1. An image formation apparatus comprising:
   reading means capable of reading a series of image data consisting of plural pages including a color image and a black/white image, in order of page;
   image formation means for forming the black/white image on a sheet on the basis of the image data subjected to the reading process by said reading means;
   judgment means for judging whether the image data being the reading target by said reading means represents the color image or the black/white image, in the unit of page; and
   control means for performing control whether or not the image forming of the image data is to be performed on the basis of the judged result by said judgment means,
   wherein said control means controls said image formation means not to perform the image forming based on the image data, according as the image data is judged by said judgment means to represent the color image, and controls said image formation means to perform the image forming based on the image data, according as the image data is judged not to represent the color image, and
   wherein said control means causes said image formation means to perform the image forming for the pages of the black/white image in the series of image data consisting of the plural pages, and inhibits said image formation means from performing the image forming for the pages of the color image.

2. An apparatus according to claim 1, further comprising first stacking means for stacking the sheet on which the color image is formed, and second stacking means for stacking the sheet on which the image is formed by said image formation means and the sheet which is fed from said first stacking means, and
   wherein said control means performs control to feed the sheet stacked on said first stacking means to said second stacking means according as the image data is judged by said judgment means to represent the color image.

3. An apparatus according to claim 2, wherein the sheet stacked on said first stacking means is fed to said second stacking means without passing said image formation means.

4. An apparatus according to claim 2, wherein the sheet stacked on said first stacking means is the sheet on which only the color original is image formed by another image formation apparatus and which is stacked by a user.

5. An apparatus according to claim 2, further comprising detection means for detecting whether or not the sheet is stacked on said first stacking means, and
wherein said control means performs the control according to the judged result of said judgment means when it is detected by said detection means that the sheet is stacked on said first stacking means, and performs the control independent of said judgment means when it is detected that the sheet is not stacked on said first stacking means.

6. An apparatus according to claim 5, wherein, if it is detected that the sheet is not stacked on said first stacking means, said control means inhibits said judgment means from performing the judgment process, and controls said image formation means to perform the image formation process based on the image data every time said reading means performs the reading process of the image data.

7. An image formation apparatus comprising:
reading means capable of reading a series of image data consisting of plural pages including a color image and a black/white image, in order of page;
image formation means for forming the color image on a sheet on the basis of the image data subjected to the reading process by said reading means;
judgment means for judging whether the image data being the reading target by said reading means represents the color image or the black/white image, in the unit of page; and
control means for performing control whether or not the image forming of the image data is to be performed on the basis of the judged result by said judgment means,
wherein said control means controls said image formation means to perform the image forming based on the image data, according as the image data is judged by said judgment means to represent the color image, and controls said image formation means not to perform the image forming based on the image data, according as the image data is judged not to represent the color image, and
wherein said control means causes said image formation means to perform the image forming for the pages of the color image in the series of image data consisting of the plural pages, and inhibits said image formation means from performing the image forming for the pages of the black/white image.

8. An apparatus according to claim 7, further comprising first stacking means for stacking the sheet on which the black/white image is formed, and second stacking means for stacking the sheet on which the image is formed by said image formation means and the sheet which is fed from said first stacking means, and
wherein said control means performs control to feed the sheet stacked on said first stacking means to said second stacking means according as the image data is judged by said judgment means not to represent the color image.

9. An apparatus according to claim 8, wherein the sheet stacked on said first stacking means is fed to said second stacking means without passing said image formation means.

10. An apparatus according to claim 8, wherein the sheet stacked on said first stacking means is the sheet on which only the black/white original is image formed by another image formation apparatus and which is stacked by a user.

11. An apparatus according to claim 8, further comprising detection means for detecting whether or not the sheet is stacked on said first stacking means, and
wherein said control means performs the control according to the judged result of said judgment means when it is detected by said detection means that the sheet is stacked on said first stacking means, and performs the control independent of said judgment means when it is detected that the sheet is not stacked on said first stacking means.

12. An apparatus according to claim 11, wherein, if it is detected that the sheet is not stacked on said first stacking means, said control means inhibits said judgment means from performing the judgment process, and controls said image formation means to perform the image formation process based on the image data every time said reading means performs the reading process of the image data.

13. A control method for an image formation apparatus comprising:
a reading step capable of reading a series of image data consisting of plural pages including a color image and a black/white image, in order of page;
an image formation step of forming the black/white image on a sheet on the basis of the image data subjected to the reading process in said reading step;
a judgment step of judging whether the image data being the reading target in said reading step represents the color image or the black/white image, in a unit of page; and
a control step of performing control whether or not the image forming of the image data is to be performed on the basis of the judged result in said judgment step,
wherein in said control step it is controlled not to perform the image forming based on the image data according as the image data is judged in said judgment step to represent the color image, and it is controlled to perform the image forming based on the image data according as the image data is judged not to represent the color image, and
wherein said control step causes said image formation step to perform the image forming for the pages of the black/white image in the series of image data consisting of the plural pages, and inhibits said image formation step from performing the image forming for the pages of the color image.

14. A method according to claim 13, wherein the image formation apparatus includes first stacking means for stacking the sheet on which the color image is formed and second stacking means for stacking the sheet on which the image is formed and the sheet which is fed from the first stacking means, and
wherein in said control step it is controlled to feed the sheet stacked on the first stacking means to the second stacking means according as the image data is judged in said judgment step to represent the color image.

15. A method according to claim 14, wherein the sheet stacked on the first stacking means is fed to the second stacking means without passing the image formation means.

16. A method according to claim 14, wherein the sheet stacked on the first stacking means is the sheet on which only the color original is image formed by another image formation apparatus and which is stacked by a user.

17. A method according to claim 14, further comprising a detection step of detecting whether or not the sheet is stacked on the first stacking means, and
wherein in said control step the control is performed according to the judged result of said judgment step when it is detected in said detection step that the sheet is stacked on the first stacking means, and the control is performed independently of said judgment step when it is detected that the sheet is not stacked on the first stacking means.

18. A method according to claim 17, wherein, if it is detected that the sheet is not stacked on the first stacking means, said control step inhibits said judgment step from performing the judgment process, and controls the image formation means to perform the image formation process based on the image data every time the reading process is performed to the image data.

19. A control method for an image formation apparatus, comprising:
  a reading step capable of reading a series of image data consisting of plural pages including a color image and a black/white image, in order of page;
  an image formation step of forming the color image on a sheet on the basis of the image data subjected to the reading process in said reading step;
  a judgment step of judging whether the image data being the reading target in said reading step represents the color image or the black/white image, in a unit of page; and
  a control step of performing control whether or not the image forming of the image data is to be performed on the basis of the judged result in said judgment step,
  wherein in said control step it is controlled to perform the image forming based on the image data according as the image data is judged in said judgment step to represent the color image, and it is controlled not to perform the image forming based on the image data according as the image data is judged not to represent the color image, and
  wherein said control step causes said image formation step to perform the image forming for the pages of the color image in the series of image data consisting of the plural pages, and inhibits said image formation step from performing the image forming for the pages of the black/white image.

20. A method according to claim 19, wherein the image formation apparatus includes first stacking means for stacking the sheet on which the color image is formed and second stacking means for stacking the sheet on which the image is formed and the sheet which is fed from the first stacking means, and
  wherein in said control step it is controlled to feed the sheet stacked on the first stacking means to the second stacking means according as the image data is judged in said judgment step not to represent the color image.

21. A method according to claim 20, wherein the sheet stacked on the first stacking means is fed to the second stacking means without passing the image formation means.

22. A method according to claim 20, wherein the sheet stacked on the first stacking means is the sheet on which only the black/white original is image formed by another image formation apparatus and which is stacked by a user.

23. A method according to claim 20, further comprising a detection step of detecting whether or not the sheet is stacked on the first stacking means, and
  wherein in said control step the control is performed according to the judged result of said judgment step when it is detected in said detection step that the sheet is stacked on the first stacking means, and the control is performed independently of said judgment step when it is detected that the sheet is not stacked on the first stacking means.

24. A method according to claim 23, wherein, if it is detected that the sheet is not stacked on the first stacking means, said control step inhibits said judgment step from performing the judgment process, and controls the image formation means to perform the image formation process based on the image data every time the reading process is performed to the image data.

25. An image formation apparatus comprising:
  feed means capable of feeding in order of page an original consisting of plural pages to reading means performing an original reading process, the original including an original of a color image and an original of a black/white image;
  image formation means for forming the black/white image on a sheet on the basis of the original read by said reading means;
  carrying control means for controlling sheet carrying from first stacking means to second stacking means and sheet carrying from said image formation means to said second stacking means; and
  control means for performing control to cause said image formation means to perform the image formation and carry the sheet on which the black/white image was formed to said second stacking means according as the page being the feed target by said feed means is the original of the black/white image, and to inhibit said image formation means from performing the image formation and perform the sheet carrying from said first stacking means to said second stacking means according as the page being the feed target by said feed means is the original of the color image,
  wherein said control means causes said image formation means to perform the image formation for the pages of the black/white image in the original consisting of the plurality pages, and inhibits said image formation means from performing the image formation for the pages of the color image.

26. An apparatus according to claim 25, wherein said control means performs the control when the sheet is stacked on said first stacking means, and
  when the sheet is not stacked on said first stacking means, said apparatus causes said image formation means to perform the image formation for all the pages of the original consisting of the plural pages without the control by said control means.

27. An apparatus according to claim 25, wherein the sheet is carried from said first stacking means to said second stacking means without said image formation means.

28. An image formation apparatus comprising:
  feed means capable of feeding in order of page an original consisting of plural pages to reading means performing an original reading process, the original including an original of a color image and an original of a black/white image;
  image formation means for forming the black/white image on a sheet on the basis of the original read by said reading means;
  carrying control means for controlling sheet carrying from first stacking means to second stacking means and sheet carrying from said image formation means to said second stacking means; and
  control means for performing control to cause said image formation means to perform the image formation and carry the sheet on which the color image was formed to said second stacking means according as the page being the feed target by said feed means is the original of the color image, and to inhibit said image formation means from performing the image formation and perform the sheet carrying from said first stacking means to said second stacking means according as the page being the feed target by said feed means is the original of the black/white image, wherein said control means causes said image formation means to perform the image formation for the pages of the color image in the original consisting of the plural pages, and inhibits said image formation means from performing the image formation for the pages of the black/white image.

29. An apparatus according to claim 28, wherein said control means performs the control when the sheet is stacked on said first stacking means, and when the sheet is not stacked on said first stacking means, said apparatus causes said image formation means to perform the image formation for all the pages of the original consisting of the plural pages without the control by said control means.

30. An apparatus according to claim 28, wherein the sheet is carried from said first stacking means to said second stacking means without said image formation means.

31. An image formation apparatus comprising:

feed means capable of feeding in order of page an original consisting of plural pages to reading means performing an original reading process, the original including an original of a first-type image and an original of a second-type image;

image formation means for forming on a sheet the image of the original read by said reading means;

carrying control means for controlling carrying of the sheet on which the image corresponding to the second-type image was formed from first stacking means to second stacking means and sheet carrying from said image formation means to said second stacking means; and control means for performing control to cause said image formation means to perform the image formation of the first-type image and carry the sheet on which the first-type image was formed to said second stacking means according as the page being the feed target by said feed means is the original of the first-type image, and to inhibit said image formation means from performing the image formation of the second-type image and perform the carrying of the sheet on which the image corresponding to the second-type image was formed from said first stacking means to said second stacking means according as the page being the feed target by said feed means is the original of the second-type image, wherein said control means causes said image formation means to perform the image formation for the pages of the first-type image in the original consisting of the plural pages, and inhibits said image formation means from performing the image formation for the pages of the second-type image.

32. An apparatus according to claim 31, wherein the original of the first-type image is the original on which a color image has been formed and the original of the second-type image is the original on which a black/white image has been formed.

33. An apparatus according to claim 31, wherein the original of the first-type image is the original on which a black/white image has been formed and the original of the second-type image is the original on which a color image has been formed.

34. An apparatus according to claim 31, wherein said control means performs the control when the sheet is stacked on said first stacking means, and when the sheet is not stacked on said first stacking means, said apparatus causes said image formation means to perform the image formation for all the pages of the original consisting of the plural pages without the control by said control means.

35. An apparatus according to claim 31, wherein the sheet is carried from said first stacking means to said second stacking means without said image formation means.

36. An apparatus according to claim 31, wherein the sheet set to said first stacking means is the sheet on which the image formation of the pages of the second-type image in the original consisting of the plural pages was performed.

37. A control method for an image formation apparatus which comprises: a feed means capable of feeding in order of page an original consisting of plural pages to a reading means performing an original reading process, the original including an original of a color image and an original of a black/white image; and an image formation means for forming the black/white image on a sheet on the basis of the original read by the reading means, said method comprising:

a carrying control step of controlling sheet carrying from a first stacking means to a second stacking means and sheet carrying from the image formation means to the second stacking means; and a control step of performing control to cause the image formation means to perform the image formation and carry the sheet on which the black/white image was formed to the second stacking means according as the page being the feed target by the feed means is the original of the black/white image, and to inhibit the image formation means from performing the image formation and perform the sheet carrying from the first stacking means according as the page being the feed target by the feed means is the original of the color image, wherein said control step causes the image formation means to perform the image formation for the pages of the black/white image in the original consisting of the plural pages, and inhibits the image formation means from performing the image formation for the pages of the color image.

38. A method according to claim 37, wherein said control step performs the control when the sheet is stacked on the first stacking means, and when the sheet is not stacked on the first stacking means, said method causes the image formation means to perform the image formation for all the pages of the original consisting of the plural pages without the control in said control step.

39. A method according to claim 37, wherein the sheet is carried from the first stacking means to the second stacking means without the image formation means.

40. A control method for an image formation apparatus comprising: a feed means capable of feeding in order of page an original consisting of plural pages to a reading means performing an original reading process, the original including an original of a color image and an original of a black/white image; and an image formation means for forming the black/white image on a sheet on the basis of the original read by the reading means, said method comprising:

a carrying control step of controlling sheet carrying from a first stacking means to a second stacking means and sheet carrying from the image formation means to the second stacking means; and a control step of performing control to cause the image formation means to perform the image formation and carry the sheet on which the color image was formed to the second stacking means according as the page being the feed target by the feed means is the original of the color image, and to inhibit the image formation means from performing the image formation and perform the sheet carrying from the first stacking means to the second stacking means according as the page being the feed target by the feed means is the original of the black/white image, wherein said control step causes the image formation means to perform the image formation for the pages of the color image in the original consisting of the plural pages, and inhibits the image formation means from performing the image formation for the pages of the black/white image.

41. A method according to claim 40, wherein said control step performs the control when the sheet is stacked on the first stacking means, and when the sheet is not stacked on the first stacking means, said method causes the image formation means to perform the image formation for all the pages of the original consisting of the plural pages without the control in said control step.

42. A method according to claim 40, wherein the sheet is carried from the first stacking means to the second stacking means without the image formation means.

43. A control method for an image formation apparatus which comprises: a feed means capable of feeding in order of page an original consisting of plural pages to a reading means performing an original reading process, the original including an original of a first-type image and an original of a second-type image; and an image formation means for forming on a sheet the image of the original read by the reading means, said method comprising:

a carrying control step of controlling carrying of the sheet on which the image corresponding to the second-type image was formed from a first stacking means to a second stacking means and sheet carrying from the image formation means to the second stacking means; and a control step of performing control to cause the image formation means to perform the image formation of the first-type image and carry the sheet on which the first-type image was formed to the second stacking means according as the page being the feed target by the feed means is the original of the first-type image, and to inhibit the image formation means from performing the image formation of the second-type image and perform the carrying of the sheet on which the image corresponding to the second-type image was formed from the first stacking means to the second stacking means according as the page being the feed target by the feed means is the original of the second-type image, wherein said control step causes the image formation means to perform the image formation for the pages of the first-type image in the original consisting of the plural pages, and inhibits the image formation means from performing the image formation for the pages of the second-type image.

44. A method according to claim 43, wherein the original of the first-type image an original on which a color image has been formed and the original of the second-type image is an original on which a black/white image has been formed.

45. A method according to claim 43, wherein the original of the first-type image is an original on which a black/white image has been formed and the original of the second-type image is an original on which a color image has been formed.

46. A method according to claim 43, wherein said control step performs the control when the sheet is stacked on the first stacking means, and when the sheet is not stacked on the first stacking means, said method causes the image formation means to perform the image formation for all the pages of the original consisting of the plural pages without the control in said control step.

47. A method according to claim 43, wherein the sheet is carried from the first stacking means to the second stacking means without the image formation means.

48. A method according to claim 43, wherein the sheet set to the first stacking means is the sheet on which the image formation of the pages of the second-type image in the original consisting of the plural pages was performed.

49. A computer-readable storage medium which stores a program to execute a control method for an image formation apparatus, said method comprising:

a reading step capable of reading a series of image data consisting of plural pages including a color image and a black/white image, in order of page;

an image formation step of forming the black/white image on a sheet on the basis of the image data subjected to the reading process in said reading step;

a judgment step of judging whether the image data being the reading target in said reading step represents the color image or the black/white image, in a unit of page; and a control step of performing control whether or not the image forming of the image data is to be performed on the basis of the judged result in said judgment step, wherein in said control step it is controlled not to perform the image forming based on the image data according as the image data is judged in said judgment step to represent the color image, and it is controlled to perform the image forming based on the image data according as the image data is judged not to represent the color image, and wherein said control step causes said image formation step to perform the image forming for the pages of the black/white image in the series of image data consisting of the plural pages, and inhibits said image formation step from performing the image forming for the pages of the color image.

50. A computer-readable storage medium which stores a program to execute a control method for an image formation apparatus, said method comprising:

a reading step capable of reading a series of image data consisting of plural pages including a color image and a black/white image, in order of page;

an image formation step of forming the color image on a sheet on the basis of the image data subjected to the reading process in said reading step;

a judgment step of judging whether the image data being the reading target in said reading step represents the color image or the black/white image, in a unit of page; and a control step of performing control whether or not the image forming of the image data is to be performed on the basis of the judged result in said judgment step, wherein in said control step it is controlled to perform the image forming based on the image data according as the image data is judged in said judgment step to represent the color image, and it is controlled not to perform the image forming based on the image data according as the image data is judged not to represent the color image, and wherein said control step causes said image formation step to perform the image forming for the pages of the color image in the series of image data consisting of the plural pages, and inhibits said image formation step from performing the image forming for the pages of the black/white image.

51. A computer-readable storage medium which stores a program to execute a control method for an image formation apparatus which comprises: a fee means capable of feeding in order of page an original consisting of plural pages to a reading means performing an original reading process, the original including an original of a color image and an original of a black/white image; and an image formation means for forming the black/white image on a sheet on the basis of the original read by the reading means, said method comprising:

a carrying control step of controlling sheet carrying from a first stacking means to a second stacking means and sheet carrying from the image formation means to the second stacking means; and a control step of performing control to cause the image formation means to perform the image formation and carry the sheet on which the black/white image was formed to the second stacking means according as the page being the feed target by the feed means is the original of the black/white image, and to inhibit the image formation means from performing the image formation and perform the sheet carrying from the first stacking means to the second stacking means according as the page being the feed target by the feed means is the original of the color image, wherein said control step causes the image formation means to perform the image formation for the pages of the black/white image in the original consisting of the plural pages, and inhibits the image formation for the pages of the color image.

52. A computer-readable storage medium which stores a program to execute a control method for an image formation apparatus comprising: a feed means capable of feeding in order of page an original consisting of plural pages to a reading means performing an original reading process, the original of a color image and an original of a black/white image; and an image formation means for forming the black/white image on a sheet on the basis of the original read by the reading means, said method comprising:

a carrying control step of controlling sheet carrying from a first stacking means to a second stacking means and sheet carrying from the image formation means to the second stacking means; and a control step of performing control to cause the image formation means to perform the image formation and carry the sheet on which the color image was formed to the second stacking means according as the page being the feed target by the feed means is the original of the color image, and to inhibit the image formation means from performing the image formation and perform the sheet carrying from the first stacking means to the second stacking means according as the page being the feed target by the feed means is the original of the black/white image, wherein said control step causes the image formation means to perform the image formation for the pages of the color image in the original consisting of the plural pages, and inhibits the image formation means from performing the image formation for the pages of the black/white image.

53. A computer-readable storage medium which stores a program to execute a control method for an image formation apparatus which comprises: a feed means capable of feeding in order of page an original consisting of plural pages to a reading means performing an original reading process, the original including an original of a first-type image and an original of a second-type image; and an image formation means for forming on a sheet the image of the original read by the reading means, said method comprising:

a carrying control step of controlling carrying of the sheet on which the image corresponding to the second-type image was formed from a first stacking means to a second stacking means and sheet carrying from the image formation means to the second stacking means; and a control step of performing control to cause the image formation means to perform the image formation of the first-type image and carry the sheet on which the first-type image was formed to the second stacking means according as the page being the feed target by the feed means is the original of the first-type image, and to inhibit the image formation means from performing the image formation of the second-type image and perform the carrying of the sheet on which the image corresponding to the second-type image was formed from the first stacking means to the second stacking means according as the page being the feed target by the feed means is the original of the second-type image, wherein said control step causes the image formation means to perform the image formation for the pages of the first-type image in the original consisting of the plural pages, and inhibits the image formation means from performing the image formation for the pages of the second-type image.

* * * * *

UNITED STATES PATENT AND TRADEMARK OFFICE
CERTIFICATE OF CORRECTION

PATENT NO.   : 6,263,173 B1
DATED        : July 17, 2001
INVENTOR(S)  : Shinichi Nakamura et al.

It is certified that error appears in the above-identified patent and that said Letters Patent is hereby corrected as shown below:

Column 6,
Line 14, "can not" should read -- cannot --.
Line 29, "is" should read -- are --.

Column 7,
Line 22, "can not" should read -- cannot --.
Line 24, "can not" should read -- cannot --.

Column 15,
Line 26, "an" should read -- a --.

Column 25,
Line 64, "an" should read -- is an --.

Signed and Sealed this

Thirtieth Day of April, 2002

Attest:

JAMES E. ROGAN
*Attesting Officer*   *Director of the United States Patent and Trademark Office*